(12) United States Patent
Aio et al.

(10) Patent No.: US 11,438,814 B2
(45) Date of Patent: Sep. 6, 2022

(54) WIRELESS COMMUNICATION DEVICE AND WIRELESS COMMUNICATION METHOD

(71) Applicant: SONY CORPORATION, Tokyo (JP)

(72) Inventors: Kosuke Aio, Kanagawa (JP); Yusuke Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 16/978,517

(22) PCT Filed: Jan. 29, 2019

(86) PCT No.: PCT/JP2019/002980
§ 371 (c)(1),
(2) Date: Sep. 4, 2020

(87) PCT Pub. No.: WO2019/176346
PCT Pub. Date: Sep. 19, 2019

(65) Prior Publication Data
US 2020/0404557 A1    Dec. 24, 2020

(30) Foreign Application Priority Data

Mar. 14, 2018  (JP) .............................. JP2018-046524

(51) Int. Cl.
*H04W 4/00*      (2018.01)
*H04W 36/00*    (2009.01)
(Continued)

(52) U.S. Cl.
CPC .  *H04W 36/00837* (2018.08); *H04W 36/0079* (2018.08); *H04W 36/08* (2013.01); *H04W 84/12* (2013.01)

(58) Field of Classification Search
CPC ....... H04W 36/00837; H04W 36/0079; H04W 36/08; H04W 84/12
See application file for complete search history.

(56) References Cited

U.S. PATENT DOCUMENTS

2016/0066349 A1\* 3/2016 Seok ................. H04W 74/0808
370/338
2016/0262067 A1\* 9/2016 Hara ..................... H04W 36/36
(Continued)

FOREIGN PATENT DOCUMENTS

| JP | 2007-221195 A | 8/2007 |
| JP | 2011-160484 A | 8/2011 |

(Continued)

OTHER PUBLICATIONS

Perahia, et al., "Proposed Text Changes for Client Management", IEEE P802.11 Wireless LANS, Document: IEEE 802.11-17/YYYYr0, Jan. 2017, 08 pages.

(Continued)

*Primary Examiner* — Abdelnabi O Musa
(74) *Attorney, Agent, or Firm* — Chip Law Group

(57) ABSTRACT

[Problem] To enable a more appropriate BSS transition threshold to be set in a wireless LAN system. [Solution] A wireless communication device functioning as an access point of a wireless LAN includes: a control unit that dynamically sets a threshold used when a station belonging to a BSS of its own device attempts to transit to another BSS belonging to the same ESS as the BSS based on information included in a wireless signal from an external device.

18 Claims, 25 Drawing Sheets

(51) Int. Cl.
*H04W 36/08* (2009.01)
*H04W 84/12* (2009.01)

(56) References Cited

U.S. PATENT DOCUMENTS

| | | | |
|---|---|---|---|
| 2016/0373989 A1 | 12/2016 | Tinnakornsrisuphap et al. | |
| 2017/0208546 A1* | 7/2017 | Park | H04W 72/042 |
| 2017/0367118 A1* | 12/2017 | Choi | H04W 84/12 |
| 2018/0027573 A1* | 1/2018 | Cariou | H04W 72/085 |
| | | | 370/329 |
| 2018/0176069 A1* | 6/2018 | Lee | H04L 27/2655 |
| 2018/0279209 A1* | 9/2018 | Fang | H04L 5/005 |
| 2019/0246312 A1* | 8/2019 | Kim | H04W 52/365 |
| 2021/0297883 A1* | 9/2021 | Canpolat | H04W 24/10 |

FOREIGN PATENT DOCUMENTS

| | | |
|---|---|---|
| JP | 2016-039445 A | 3/2016 |
| JP | 2016-163186 A | 9/2016 |
| TW | 201707479 A | 2/2017 |

OTHER PUBLICATIONS

International Search Report and Written Opinion of PCT Application No. PCT/JP2019/002980, dated Mar. 26, 2019, 08 pages of ISRWO.

Office Action for TW Patent Application No. 108106991, dated Feb. 14, 2022, 14 pages of Office Action.

Perahia, et al., "Proposed Text Changes for Client Management", IEEE 802.11-17/YYYYr0, Wireless LANs, Sep. 11, 2017, 7 pages.

\* cited by examiner

FIG.4

| CAPABILITY INFORMATION | Listen interval | CURRENT CONNEC-TION DESTINATION AP ADDRESS | SSID | ··· |
|---|---|---|---|---|
| 2 | 2 | 6 | 2-34 | |

Octets:

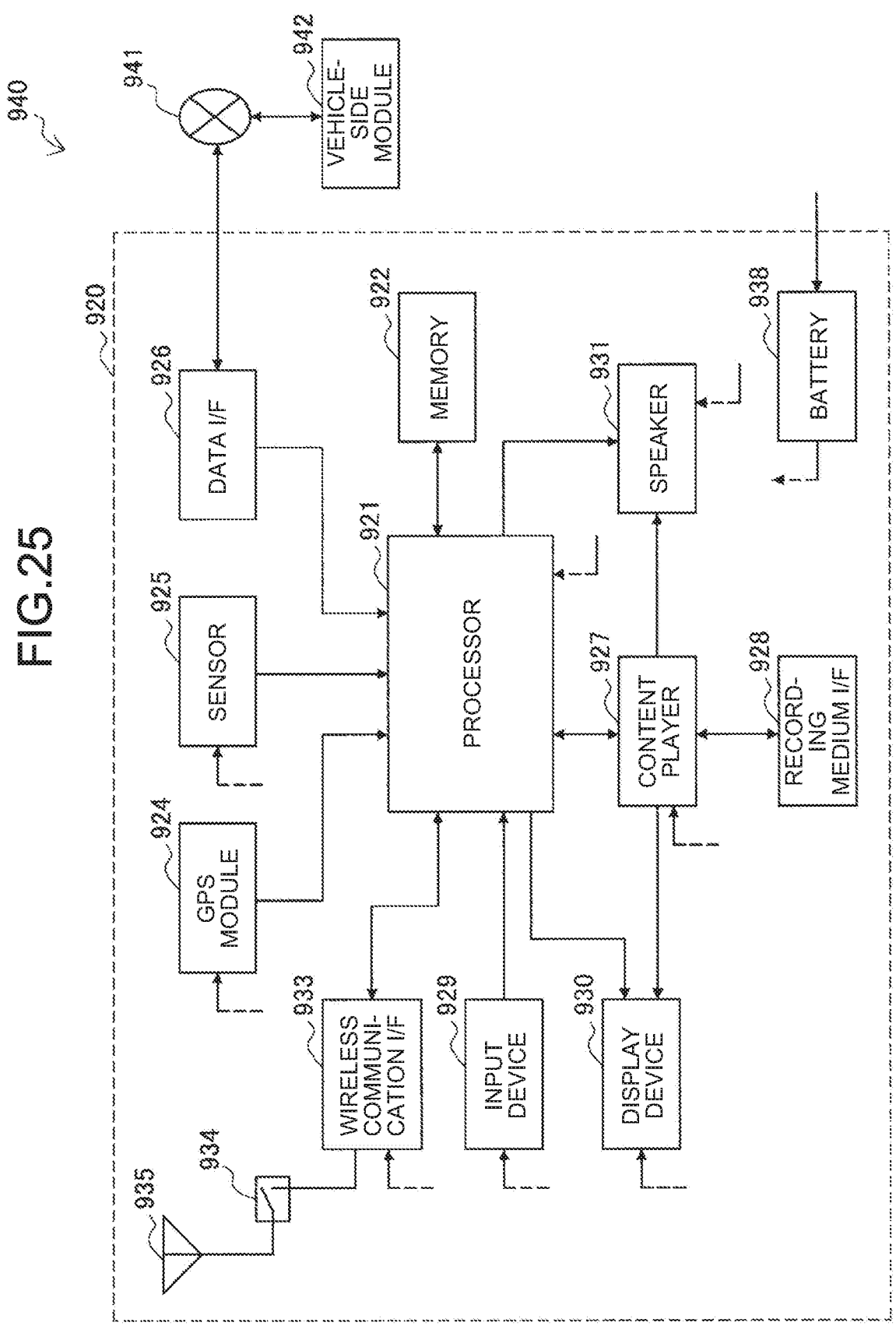

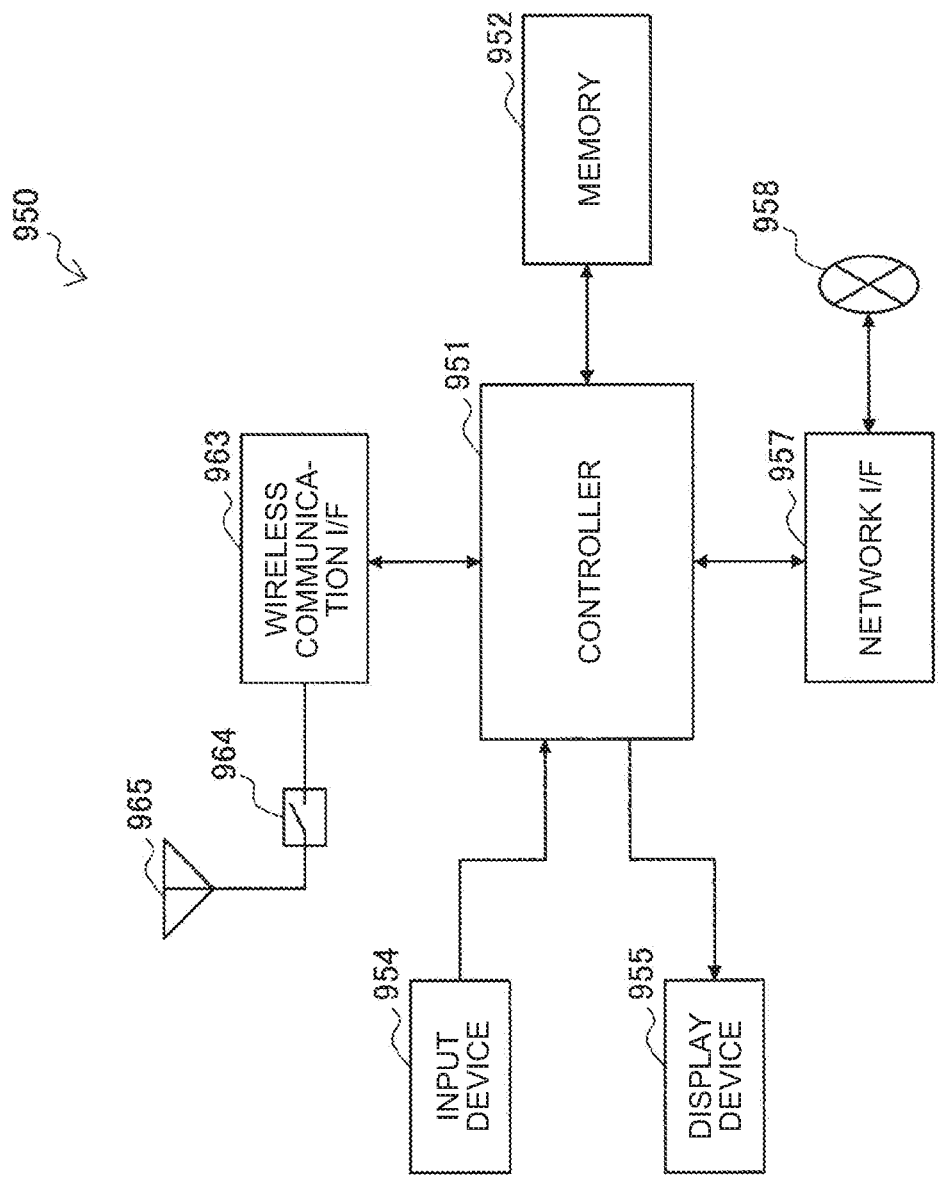

WIRELESS COMMUNICATION DEVICE AND WIRELESS COMMUNICATION METHOD

CROSS REFERENCE TO RELATED APPLICATIONS

This application is a U.S. National Phase of International Patent Application No. PCT/JP2019/002980 filed on Jan. 29, 2019, which claims priority benefit of Japanese Patent Application No. JP 2018-046524 filed in the Japan Patent Office on Mar. 14, 2018. Each of the above-referenced applications is hereby incorporated herein by reference in its entirety.

FIELD

The present disclosure relates to a wireless communication device and a wireless communication method.

BACKGROUND

A wireless communication system that performs communications between an access point (hereinafter, referred to as "AP" for convenience) and a station (hereinafter, referred to as "STA" for convenience) has been known. For example, a wireless local area network (LAN) that employs carrier sense multiple access/collision avoidance (CSMA/CA) has been widely known.

The AP in a wireless LAN defined in the IEEE 802.11 standard forms a cell (hereinafter, referred to as "basic service set (BSS)"), and the STA belongs to the cell to receive services. The STA can transit to another BSS that belongs to the same network (hereinafter, referred to as "extended service set (ESS)" for convenience) as the BSS to which the STA belongs.

Here, the AP controls the BSS transition of the STA by setting a threshold (hereinafter, may be referred to as a "BSS transition threshold" for convenience) used for determining the transition to another BSS.

CITATION LIST

Patent Literature

Patent Literature 1: JP 2016-039445 A
Patent Literature 2: JP 2011-160484 A

SUMMARY

Technical Problem

In this case, it may be difficult to set an appropriate BSS transition threshold. For example, when a plurality of APs belonging to the same ESS are installed in home environment or the like which a service operator who manages a wireless LAN service cannot support, it is difficult to set the appropriate BSS transition threshold for each AP.

Therefore, the present disclosure has been made in view of the above, and the present disclosure provides a new and improved wireless communication device and wireless communication method capable of setting a more appropriate BSS transition threshold in a wireless LAN system.

Solution to Problem

According to the present disclosure, a wireless communication device functioning as an access point of a wireless LAN is provided that includes:

a control unit that dynamically sets a threshold used when a station belonging to a BSS of its own device transits to another BSS belonging to the same ESS as the BSS based on information included in a wireless signal from an external device.

Moreover, according to the present disclosure, a wireless communication method realizing an access point function of a wireless LAN is provided that includes:

dynamically setting a threshold used when a station belonging to a BSS of its own device attempts to transit to another BSS belonging to the same ESS as the BSS based on information included in a wireless signal from an external device.

Moreover, according to the present disclosure, a wireless communication device functioning as a wireless LAN station is provided that includes:

a control unit that controls a transition to another BSS belonging to the same ESS as a BSS to which the ESS belongs, using a threshold that is dynamically set based on information included in a wireless signal from an external device and reception information on a wireless signal from an access point.

Moreover, according to the present disclosure, a wireless communication method realizing a station function of a wireless LAN station is provided that includes:

controlling a transition to another BSS belonging to the same ESS as a BSS to which an ESS belongs, using a threshold that is dynamically set based on information included in a wireless signal from an external device and reception information on a wireless signal from an access point.

Advantageous Effects of Invention

According to the present disclosure as described above, it is possible to set a more appropriate BSS transition threshold in a wireless LAN system.

It is noted that the above effects are not necessarily limited, and, along with or instead of the above effects, any of the effects described in the present specification or other effects which can be understood from the present specification may be exhibited.

BRIEF DESCRIPTION OF DRAWINGS

FIG. 4 is a diagram illustrating a configuration example of a reconnection request signal defined in the IEEE 802.11 standard.

FIG. 25 is a block diagram illustrating an example of a schematic configuration of a car navigation device.

FIG. 26 is a block diagram illustrating an example of a schematic configuration of a radio access point.

DESCRIPTION OF EMBODIMENTS

Figure 1:
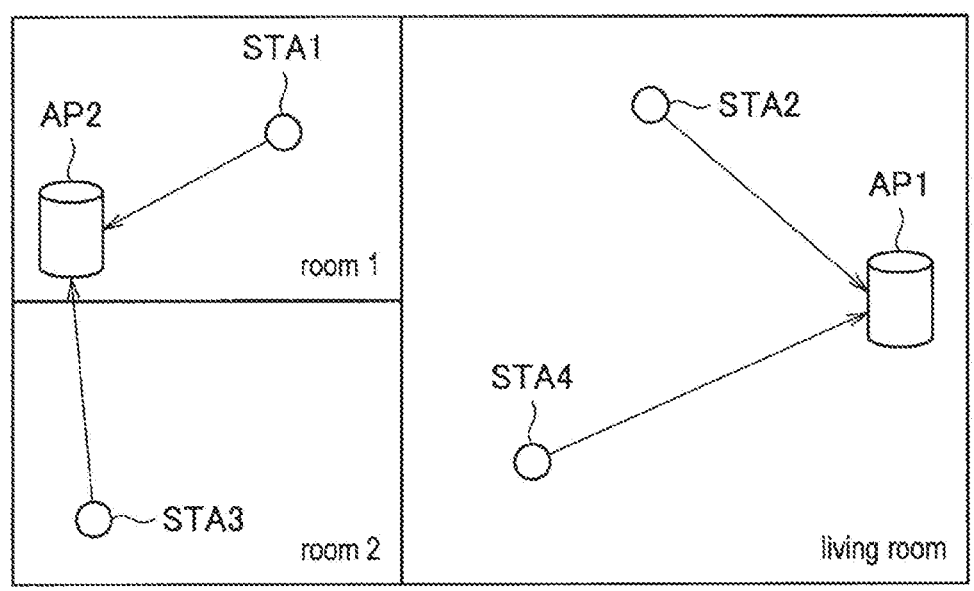
FIG. 1 is a system configuration diagram for describing the conventional technology.

Hereinafter, preferred embodiments of the present disclosure will be described in detail with reference to the accompanying drawings. Note that in the present specification and drawings, components having substantially the same functional configuration will be denoted by the same reference numerals, and a redundant description thereof will be omitted.

Note that the description will be made in the following order.

1. BACKGROUND
1.1. Overview of Background
1.2. Prior Art
2. First Embodiment
2.1. Overview
2.2. Device Configuration Example
2.3. Flow of Processing
3. Second Embodiment
4. Third Embodiment
5. Fourth Embodiment
6. Application Example
6.1. First Application Example
6.2. Second Application Example
6.3. Third Application Example
7. Summary

1. BACKGROUND

1.1. Overview of Background

First, an overview of background for creation of a technology of the present disclosure will be described.

As described above, an STA in a wireless LAN standardized by the IEEE 802.11 standard can transit to another BSS belonging to the same ESS as a BSS to which the STA belongs. In the standards prior to the IEEE 802.11ax standard, only a method in which the AP commands the STA is allowed for the transition between the BSSs belonging to the same ESS. On the other hand, in the IEEE 802.11ax standard which is currently standardized, a mechanism that includes ESS information, a BSS transition threshold, or the like, which is used to determine the transition to another BSS, in a wireless signal to allow an AP to notify an STA of the information is employed. Therefore, the STA is expected to be able to determine by itself whether to transit to another BSS by using the information.

Here, although it is allowed in the standard to adjust the BSS transition threshold based on the surrounding environment, the specific adjusting method is not defined as the standard. Therefore, it is considered that a service operator who manages the wireless LAN service adjusts the BSS transition threshold for each AP based on installation positions of each AP or coverage of the BSS desired to be secured.

For example, when a plurality of APs belonging to the same ESS are installed in home environment or the like which the service operator cannot support, it is considered difficult to set the appropriate BSS transition threshold for each AP. As a result, for example, the BSS transition threshold is set to be too low, and therefore it becomes difficult to properly perform the transition to another BSS by the STA, or the BSS transition threshold is set to be too high, and therefore there is a risk that the STA attempts to transit to another BSS, and scanning of the surrounding environment or transmission of the reconnection request signal is repeated. Therefore, the AP is required to set a more appropriate BSS transition threshold without passing through the service operator. In addition, when the position and on/off of the APs are frequently changed like a mobile router or the number of APs is changed, it is preferable to reset the more appropriate BSS transition threshold.

The above-mentioned Patent Document 1 discloses a technology of optimizing communication parameters by scanning the surrounding environment, but when the communication environment is likely to be changed, the time required for scanning the surrounding environment becomes longer or the scanning frequency becomes high, so the communication efficiency becomes poor. Therefore, it is preferable to set the BSS transition threshold without scanning the surrounding environment as much as possible (or while reducing the time required for scanning).

Further, Patent Document 2 discloses a technology of determining a transition to another BSS using a plurality of BSS transition threshold, but a method of setting a BSS transition threshold is not defined and the technology cannot set a more appropriate BSS transition threshold according to the surrounding environment.

1.2. Prior Art

Next, the prior art related to the present disclosure will be described with reference to FIGS. 1 to 5.

In describing the prior art, a system configuration as illustrated in FIG. 1 is considered. More specifically, a wireless LAN system having two APs (AP1 and AP2 in the drawings) and four STAs (STA1 to STA4 in the drawings) in the home is considered.

The AP is a wireless communication device that is connected to an external network and provides the STA with communication with the external network. For example, the AP is connected to the Internet, and communicates the STA with a device on the Internet or a device connected via the Internet.

The STA is a wireless communication device that communicates with the AP. The type of STA is not particularly limited. For example, the STA may be a display having a display function, a memory having a storage function, a keyboard and a mouse having an input function, a speaker having a sound output function, and a smartphone having a function of executing advanced calculation processing. Each STA can select an AP with the best communication quality, and as illustrated in FIG. 1, the STA2 and STA4 are connected to the AP1, and the STA1 and STA3 are connected to the AP2.

Here, a flow of processing of the AP and the STA at the time of the conventional BSS transition will be described with reference to FIG. 2. As the premise, it is assumed that the STA1 belongs to the BSS formed by the AP1 (unlike the situation in FIG. 1) in step S100 in FIG. 2.

Figure 2:
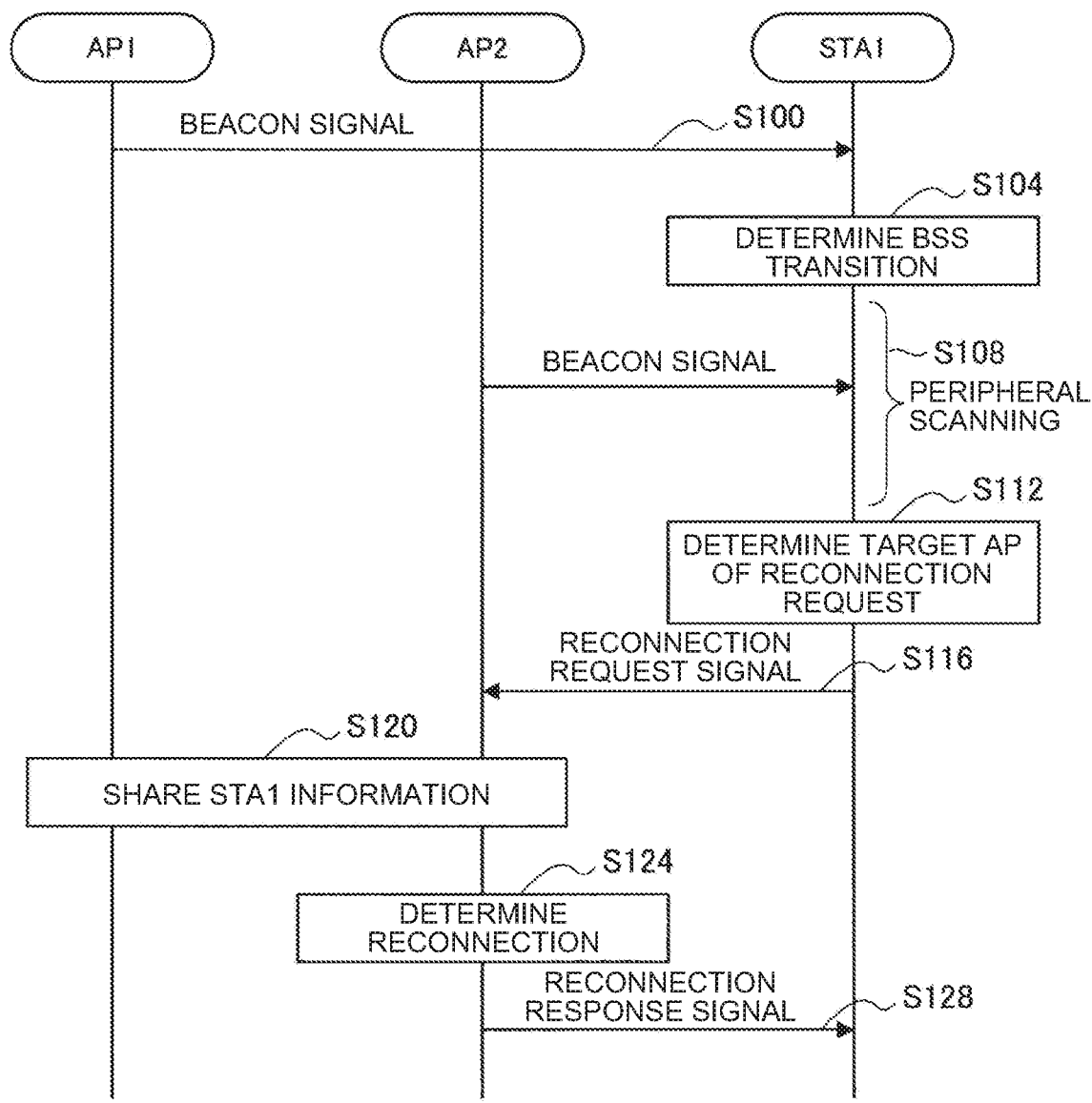
FIG. 2 is a sequence diagram illustrating an example of a flow of processing by an AP and an STA at the time of the conventional BSS transition.

In step S100 in FIG. 2, the STA1 receives a beacon signal from the AP1 and acquires ESS information and a BSS transition threshold in an ESS report element included in the beacon signal. Then, in step S104, the STA1 determines whether to transit to another BSS based on the information. More specifically, the STA1 compares reception power of the beacon signal with the BSS transition threshold, and determines the transition to another BSS when the reception power of the beacon signal is equal to or lower than the BSS transition threshold.

In step S108, the STA1 scans another AP that belongs to the same ESS as the AP1. In step S112, upon detecting one or two or more other APs belonging to the same ESS as the AP1, among the APs, the STA1 determines an AP (AP2 in this example) having the highest reception power of the beacon signal as a target of a reconnection request. In step S116, the STA1 transmits a reconnection request signal to the AP2 determined as the target of the reconnection request. Unlike the normal connection request signal, the reconnection request signal includes address information (or identification information) on the AP (AP1 in this example) to which the STA1 is currently connected.

As a result, the AP2, which has received the reconnection request signal, recognizes the AP1 to which the STA1 is connected, and in step S120, acquires information (for example, authentication information or the like) on the STA1 by communicating with the AP1. Thereafter, in step S124, the AP2 determines whether the reconnection by the STA1 is possible based on the information on the STA1, and in step S128, a series of processing ends by transmitting a reconnection response signal including the determination result to the STA1. In step S120, the AP2 communicates with the AP1 and obtains the information on the STA1, so the BSS transition of the STA1 can be realized while greatly omitting the authentication processing process.

Here, a configuration example of the ESS report element defined in the IEEE 802.11ax standard will be described with reference to FIG. 3. As described above, it is assumed that the ESS report element as illustrated in FIG. 3 is included in the beacon signal transmitted from the AP and thus is notified to the STA connected to the AP.

Figure 3:
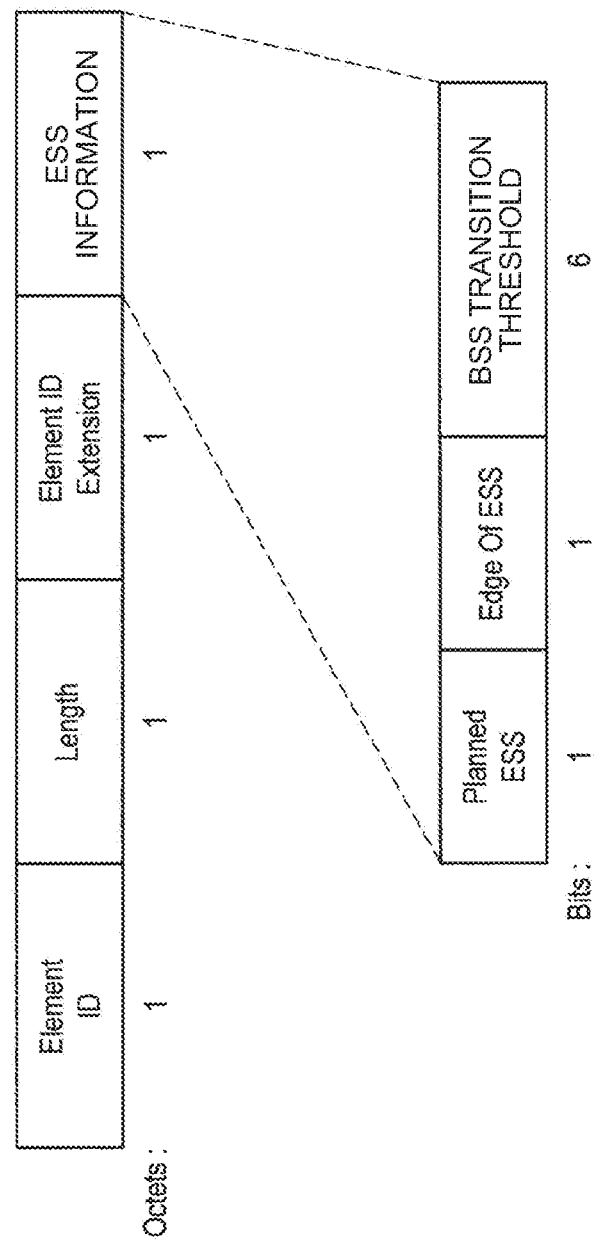
FIG. 3 is a diagram illustrating a configuration example of an ESS report element defined in the IEEE 802.11ax standard.

As illustrated in FIG. 3, the ESS report element is composed of element ID, length, Element ID extension, and ESS information, and the ESS information includes Planned ESS, edge of ESS, and BSS transition threshold.

The Planned ESS in the ESS report element is information indicating whether the AP configures the same ESS as another AP. More specifically, when the planned ESS is "1", the AP configures the same ESS as other APs. In the example of FIG. 1, since AP1 and AP2 belong to the same ESS, the planned ESS is "1".

In addition, the edge of ESS is information indicating that the AP is located at a far end of ESS compared to another AP belonging to the same ESS. Since the edge of ESS can be used to determine whether to transit to another BSS but is not currently specified in the IEEE 802.11ax standard, the edge of ESS is not described in detail in this document.

In addition, as described above, the BSS transition threshold is a threshold used when the STA connected to the AP determines whether to transit to another BSS. More specifically, the STA determines to transit to another BSS when the reception power of the beacon signal from the AP is equal to lower than the BSS transition threshold. The configuration of the ESS report element is not limited to the example of FIG. 3.

Next, a configuration example of the reconnection request signal defined in the IEEE 802.11 standard will be described with reference to FIG. 4. As described above, unlike the normal connection request signal, the signal includes address information (in the drawing, denoted by "current connection destination AP address") on the AP to which the STA is currently connected. As a result, the AP, which receives the reconnection request signal, can acquire the information (for example, authentication information or the like) on the STA from the AP to which the STA is currently connected, so the authentication processing process can be greatly omitted.

Next, the problem in the prior art will be specifically described.

Various settings in the ESS are mainly made by a service operator who manages the wireless LAN service. Therefore, it is assumed that the BSS transition threshold included in the ESS report element of FIG. 3 is set for each AP based on a result of measuring a radio wave or the like by the service operator (or predetermined control software or the like). As a result, as described above, when the plurality of APs belonging to the same ESS are installed in the home environment or the like which the service operator cannot support, it is considered difficult to set the more appropriate BSS transition threshold for each AP. In addition, it is preferable to reset the more appropriate BSS transition threshold when the position, number, or on/off of APs is frequently changed like a mobile router, but in the home environment which the service operator cannot support, it is actually impossible to reset the more appropriate BSS transition threshold.

Figure 5:
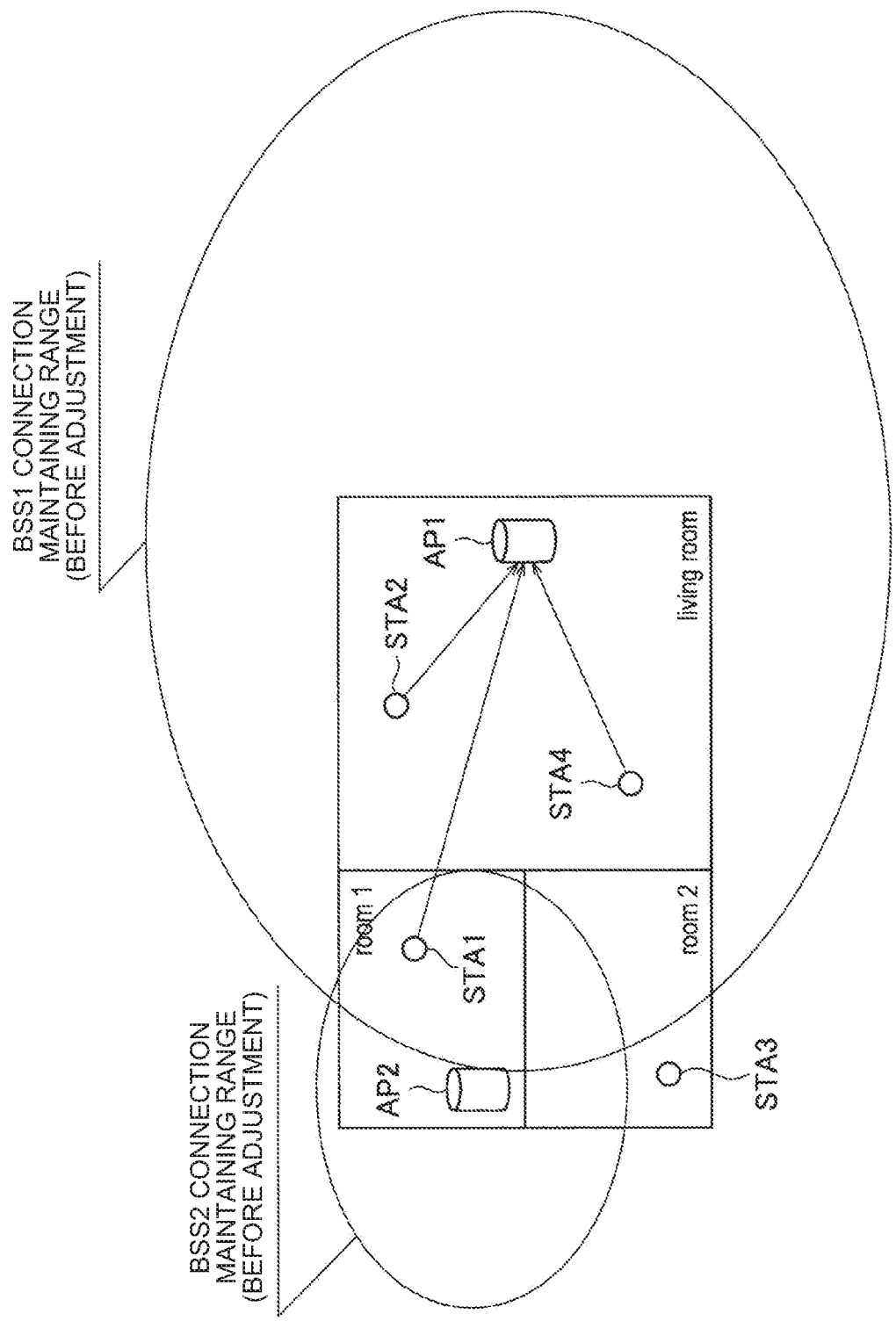
FIG. 5 is a system configuration diagram for describing the conventional technology.

For example, in FIG. 5, it is considered the case where only the AP1 initially covers all rooms, but at one time, the AP2 is newly installed and the position of the AP1 is moved. In FIG. 5, the BSS formed by the AP1 is "BSS1", and a range in which each STA attempts to maintain the connection in the BSS1 is described as "BSS1 connection maintaining range" (in other words, outside a BSS1 connection maintaining range, the reception power of the beacon signal is equal to or lower than a first threshold, the STA attempts to transit to another BSS). Further, the BSS formed by the AP2 is referred to as "BSS2", and a range in which each STA attempts to maintain the connection in the BSS2 is denoted by a "BSS2 connection maintaining range". At this time, it is preferable that the STA1 existing in room 1 (denoted by "room 1" in the drawing) is connected to the AP2 having a shorter distance and good communication quality. However, when the BSS transition threshold is set low enough to allow the AP1 to cover all rooms, the STA1 cannot determine the BSS transition by itself and will continue to be connected to the AP1, and therefore the communication quality is not improved.

In addition, the STA3 existing in room 2 (denoted by "room 2" in the drawing) also attempts to connect to the AP2 having a shorter distance and good communication quality. Here, if the AP2 sets the BSS transition threshold high, even if the STA3 is connected to AP2, the STA3 attempts to perform a reconnection request to another AP or the like because the reception power of the beacon signal from AP2 is equal to or lower than the BSS transition threshold, and therefore there is a possibility that a wasteful operation will be repeatedly generated.

The discloser of the present case has created the technology according to the present disclosure in view of the above circumstances. Hereinafter, each embodiment according to the present disclosure will be sequentially described.

2. FIRST EMBODIMENT

In the above, the background in which the technology of the present disclosure is created is described. Next, the first embodiment of the present disclosure will be described.

2.1. Overview

First, an overview of the present embodiment will be described.

An AP 100 according to the present embodiment sets two types of BSS transition thresholds such as "first threshold" and "second threshold". Here, the first threshold is similar to the conventional BSS transition threshold described above. More specifically, the first threshold is a threshold used for comparison with the reception power (or propagation loss information or the like) of the beacon signal from the own device. The second threshold is a threshold used for comparison with a difference (or difference in propagation loss information or the like) between the reception power of the beacon signal from the own device and the reception power of the beacon signal from another AP. By setting not only the first threshold but also the second threshold, the STA 200 facilitates the transition to the BSS having higher communication quality. Details of the method of using these thresholds will be described below.

Figure 6:
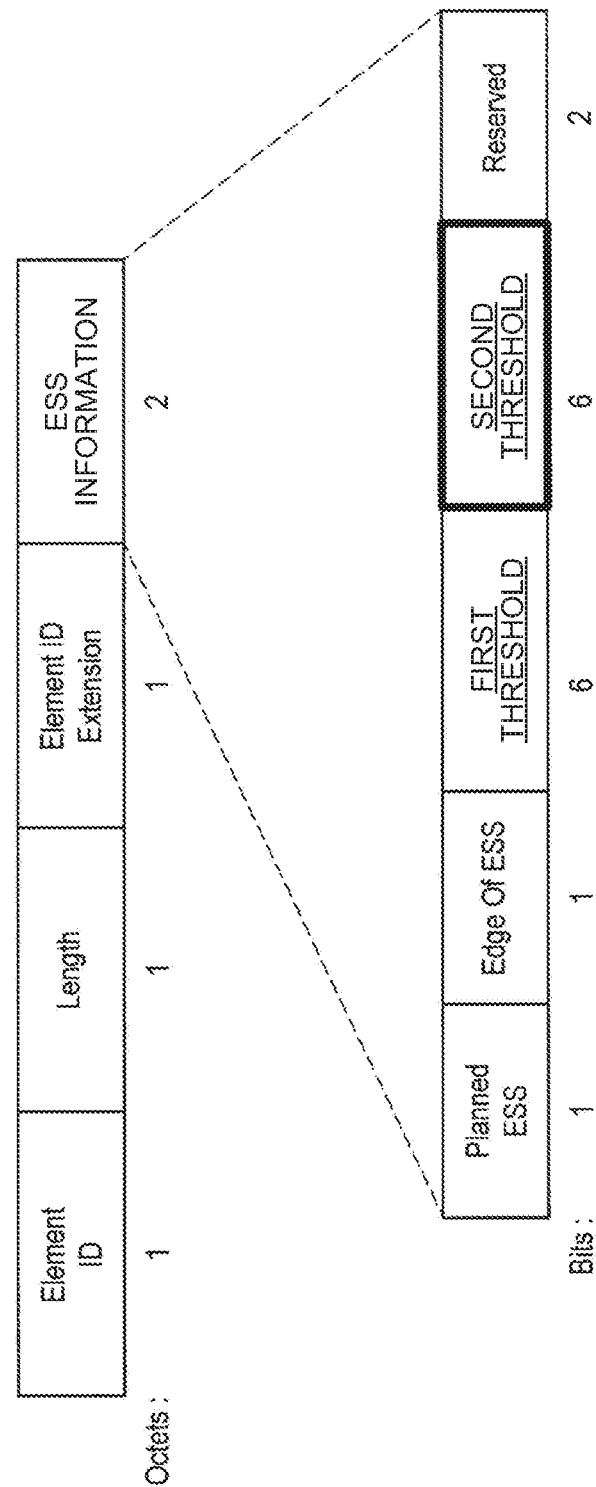
FIG. 6 is a diagram illustrating a configuration example of an ESS report element in a beacon signal transmitted from an AP 100 to each STA 200.

Here, a configuration example of the ESS report element in the beacon signal transmitted from the AP 100 to each STA 200 in the present embodiment will be described with reference to FIG. 6. As illustrated in FIG. 6, in the ESS information of the ESS report element, the AP 100 notifies each STA 200 of these thresholds by setting the first threshold and the second threshold at a later stage of the edge of ESS. Note that the configuration of the ESS report element according to the present embodiment is not limited to the example of FIG. 6. For example, a data position where the first threshold and the second threshold are provided may be changed as appropriate.

Figure 7:
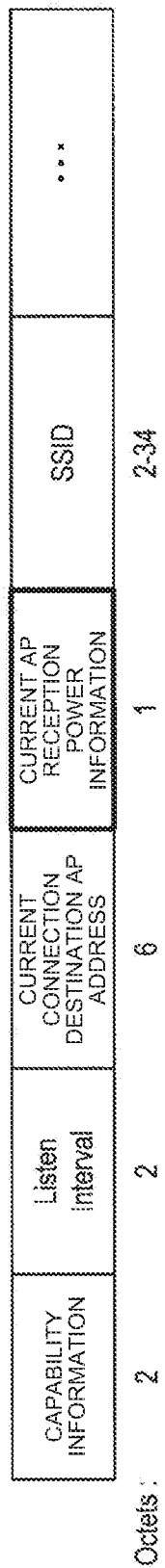
FIG. 7 is a diagram illustrating a configuration example of the reconnection request signal transmitted from the STA 200 to the AP 100.

Next, a configuration example of the reconnection request signal transmitted from the STA 200 to the AP 100 according to the present embodiment will be described with reference to FIG. 7. As illustrated in FIG. 7, unlike the conventional reconnection request signal (see FIG. 4), the STA 200 includes, in the reconnection request signal, the information (hereinafter, may be referred to as "current AP reception power information for convenience) on the reception power information of the beacon signal which is received from the AP 100 to which the STA 200 is currently being connected. As a result, the AP 100 currently connected to the STA 200 receives the reconnection request signal transmitted from a subordinate STA 200 to another AP 100, and therefore, the first threshold can be dynamically adjusted based on the current AP reception power information included in the reconnection request signal. Details of the processing of adjusting the first threshold will be described below. Note that the configuration of the reconnection request signal according to the present embodiment is not limited to the example of FIG. 7. For example, the data position where the current AP reception power information is provided may be changed as appropriate.

2.2. Device Configuration Example

The overview of the present embodiment has been described above. Next, the configuration example of each device according to the present embodiment will be described with reference to FIG. 8. Hereinafter, the device configuration example of the AP 100 will be mainly described, but since the AP 100 and the STA 200 can basically have similar functions, each configuration example described below may be treated as the STA 200.

Figure 8:
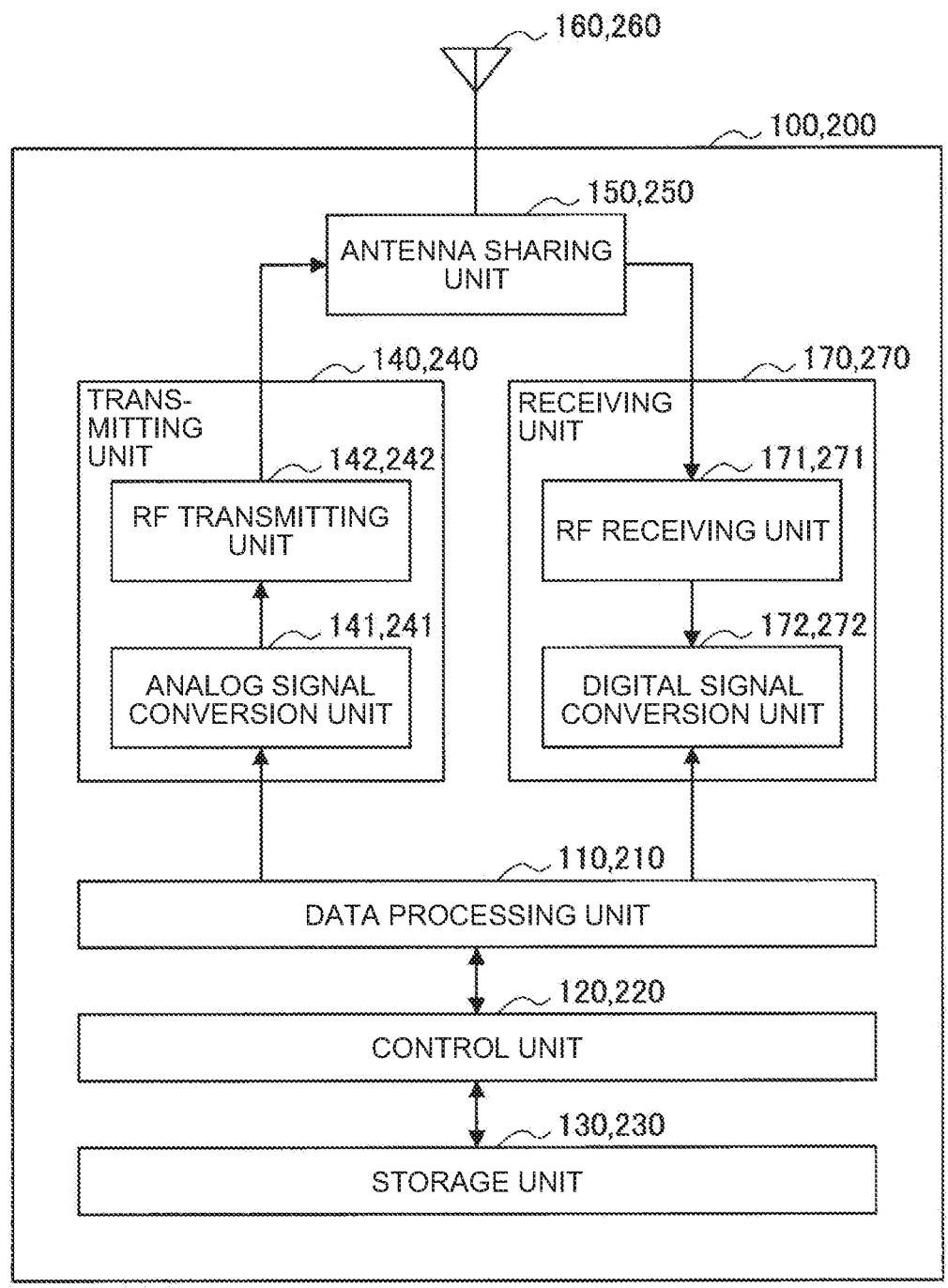
FIG. 8 is a block diagram illustrating a device configuration example of the AP 100 and the STA 200.

As illustrated in FIG. 8, the AP 100 according to the present embodiment includes a data processing unit 110, a control unit 120, a storage unit 130, a transmitting unit 140, an antenna sharing unit 150, an antenna 160, and a receiving unit 170.

(Data Processing Unit 110)

During the transmission, the data processing unit 110 generates a packet for transmission by using a transmission target data input from an upper layer, generates transmission data by performing processing such as addition of a MAC header for media access control (MAC) to the packet and addition of an error detection code, and provides the transmission data to an analog signal conversion unit 141. Further, during the reception, reception target data is extracted by performing processing such as analysis of the MAC header and an error detection in a frame on reception data provided from the digital signal conversion unit 172.

(Control Unit 120)

The control unit 120 integrally controls each component in the AP 100. More specifically, the control unit 120 performs setting of parameters (for example, coding scheme, modulation scheme, transmission power, and the like) used for processing of each component in the AP 100, scheduling of processing, and the like. In addition, in the present embodiment, the control unit 120 sets the first threshold and the second threshold, and integrally controls the generation processing and the transmission processing of the beacon signal including these thresholds in the ESS report element. Further, the control unit 120 dynamically sets the first threshold based on the current AP reception power information included in the reconnection request signal from the subordinate STA 200. In addition, the control unit 120 also determines whether or not the reconnection of the STA 200 that is a transmission source of the reconnection request signal is possible.

Further, the control unit 220 of the STA 200 controls the connection processing to the AP 100 based on the reception information (for example, the reception power information, the propagation loss information, or the like) of the beacon signal from the AP 100, the first threshold and the second threshold. Note that the processing by the control unit 120 of the AP 100 and the control unit 220 of the STA 200 is not limited thereto.

(Storage Unit 130)

The storage unit 130 is configured to store various types of information. For example, the storage unit 130 stores programs, parameters, and the like used for the processing of each component. Further, in the present embodiment, the storage unit 130 can store the first threshold and the second threshold set by the control unit 120. In addition, the storage unit 230 of the STA 200 can store information (for example, BSSID or the like) included in the beacon signal from the AP 100 and reception information or the like (for example, reception power information, propagation loss information, or the like) of the beacon signal. Note that the information stored in the storage unit 130 of the AP 100 and the storage unit 230 of the STA 200 is not limited thereto.

(Transmitting Unit 140)

The transmitting unit 140 is configured to generate a transmission signal transmitted from the antenna 160 by using the transmission data generated by the data processing unit 110. As illustrated in FIG. 8, the transmitting unit 140 includes an analog signal conversion unit 141 and an RF transmitting unit 142.

(Analog Signal Conversion Unit 141)

The analog signal conversion unit 141 is configured to convert the transmission data generated by the data processing unit 110 into an analog signal. More specifically, the analog signal conversion unit 141 generates an analog signal by performing encoding, interleaving, modulation, and the like on the transmission data generated by the data processing unit 110 based on a coding scheme and a modulation scheme set by the control unit 120, and provides the analog signal to the RF transmitting unit 142.

(RF Transmitting Unit 142)

The RF transmitting unit 142 is configured to perform frequency conversion and power amplification of the analog signal generated by the analog signal conversion unit 141. More specifically, the RF transmitting unit 142 generates a transmission signal transmitted from the antenna 160 by performing filtering processing, up-conversion processing to a carrier frequency band, amplification processing up to a predetermined power, and the like on the analog signal generated by the analog signal conversion unit 141.

(Antenna Sharing Unit 150, Antenna 160)

During the transmission, the antenna sharing unit 150 is configured to transmit the transmission signal generated by the transmitting unit 140 as an electromagnetic wave via the antenna 160. Further, during the reception, the antenna sharing unit 150 provides the receiving unit 170 with the electromagnetic wave received via the antenna 160 as a reception signal. The antenna 160 may be a chip antenna, an antenna formed by wiring on a printed circuit board, or an antenna formed by using a linear conductor element.

(Receiving Unit 170)

The receiving unit 170 is configured to acquire the reception data from the reception signal provided by the antenna sharing unit 150. As illustrated in FIG. 8, the receiving unit 170 includes an RF receiving unit 171 and a digital signal conversion unit 172.

(RF Receiving Unit 171)

The RF receiving unit 171 is configured to perform frequency conversion and power amplification on the reception signal input from the antenna sharing unit 150. More specifically, the RF receiving unit 171 outputs the analog signal by performing amplification processing up to predetermined power, down-conversion processing, filtering processing, and the like on the reception signal input from the antenna sharing unit 150. The RF receiving unit 171 may implement the processing using a low noise amplifier (LNA) or an auto gain control (AGC) circuit.

(Digital Signal Conversion Unit 172)

The digital signal conversion unit 172 is configured to convert the analog signal output by the RF receiving unit 171 into a digital signal. More specifically, the digital signal conversion unit 172 acquires reception data by performing demodulation, deinterleaving, and decoding on the analog signal output by the RF receiving unit 171 based on a decoding scheme and a demodulation scheme set by the control unit 120, and provide the reception data to the data processing unit 110.

The configuration example of each device according to the present embodiment has been described above. Note that the configuration described above with reference to FIG. 8 is merely an example, and the configurations of the AP 100 and the STA 200 are not limited to this example. Further, the configurations of the AP 100 and the STA 200 can be flexibly modified according to specifications and operation.

2.3. Flow of Processing

The configuration example of each device according to the present embodiment has been described above. Next, an example of the flow of processing by the AP 100 and the STA 200 according to the present embodiment will be described.

(Flow of Processing by STA 200)

First, an example of the flow of processing by the STA 200 will be described with reference to FIG. 9.

In step S1000, the STA 200 receives a beacon signal from any AP 100. Then, the STA 200 confirms the transmission source by analyzing the beacon signal. When the beacon signal is transmitted from the AP 100 (hereinafter, referred to as "current connection destination AP 100" for convenience) to which the STA 200 is being connected (step S1004/Yes), in step S1008, the STA 200 compares the first threshold included in the ESS report element of the beacon signal with the reception power of the beacon signal. When the reception power of the beacon signal is greater than the first threshold (step S1008/Yes), the STA 200 maintains the connection to the AP 100 without transiting to another BSS. At this time, the STA 200 stores (updates the reception power information when the reception power information is stored in advance) the reception power information of the beacon signal in the storage unit 230 in step S1012, and as a result, can implement various processing during receiving a beacon signal from another AP 100, which will be described later.

In step S1008, when the reception power of the beacon signal is equal to or lower than the first threshold (step S1008/No), in step S1016, the STA 200 attempts to transit to another BSS, and scans a peripheral AP 100 (hereinafter, referred to as "connection destination candidate AP 100" for convenience) that is a candidate for a connection destination. Details of the scanning processing of the connection destination candidate AP 100 will be described later. When the STA 200 succeeds in detecting the connection destination candidate AP 100 (step S1020/Yes), in step S1024, the STA 200 ends the processing by transmitting the reconnection request signal to the best connection destination candidate AP 100.

In step S1020, the STA 200 fails to detect the connection destination candidate AP 100 (step S1020/No), in step S1028, the STA 200 ends the processing by transmitting the reconnection request signal to the current connection destination AP 100.

In step S1004, when the beacon signal received by the STA 200 is transmitted from an AP 100 other than the current connection destination AP 100 (step S1004/No), the STA 200 confirms whether the beacon signal is transmitted from the AP 100 belonging to the same ESS. When the beacon signal is transmitted from the AP 100 belonging to the same ESS (step S1032/Yes), in step S1036, the STA 200 calculates a difference between the reception power of the beacon signal and the reception power (in the drawing, denoted by "current AP beacon reception power" for convenience) of the beacon signal from the current connection destination AP 100 stored in the storage unit 230.

In step S1040, the STA 200 compares the second threshold included in the ESS report element of the beacon signal from the current connection destination AP 100 with the difference which is the calculation result. When the difference that is the calculation result is greater than the second threshold (step S1040/Yes), in step S1044, the STA 200 ends the processing by transmitting the reconnection request signal to the AP 100 (in the drawing, denoted by "beacon transmission source AP" for convenience) that is the transmission source of the beacon signal) in order to attempt to perform another BSS.

When the beacon signal received by the STA 200 is not transmitted from the AP 100 belonging to the same ESS in step S1032 (step S1032/No), the processing ends without the BSS transition. Further, in step S1040, even when the difference that is the calculation result is equal to or lower than the second threshold (step S1040/No), the processing similarly ends without performing the BSS transition.

Here, the details of the processing of scanning the peripheral AP 100 that is the candidate for the connection destination in order to attempt for the STA 200 to transit to another BSS in step S1016 in FIG. 9 will be described with reference to FIG. 10.

Figure 10:
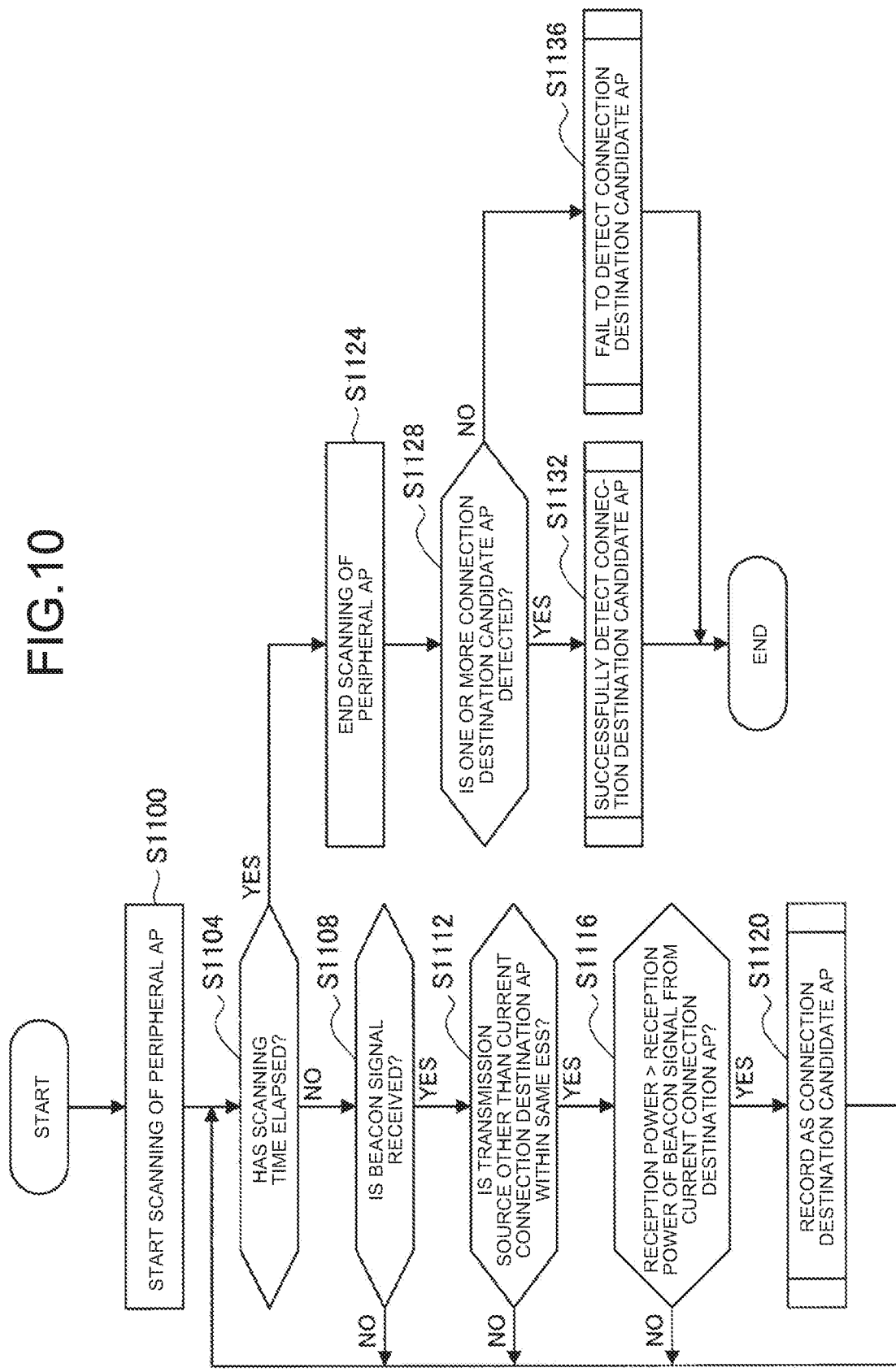
FIG. 10 is a flowchart illustrating an example of a flow of processing in which the STA 200 scans a peripheral AP 100 that is a candidate for a connection destination.

In step S1100 in FIG. 10, the STA 200 starts scanning the peripheral AP 100 that is the candidate for the connection destination. When the STA 200 receives a beacon signal from any AP 100 (step S1108/Yes) before a predetermined scanning time has elapsed (step S1104/No), the STA 200 confirms the transmission source of the beacon signal. When the transmission source of the beacon signal is the AP 100 other than the current connection destination AP 100 that belongs to the same ESS (step S1112/Yes), the STA 200 compares the reception power of the beacon signal with the reception power of the beacon signal from the current connection destination AP 100 stored in the storage unit 230. When the reception power of the beacon signal is larger than the reception power of the beacon signal from the current connection destination AP 100 (step S1116/Yes), in step S1120, the STA 200 sets the transmission source of the beacon signal as the connection destination candidate AP 100, and stores the information (for example, BSSID or the like) included in the beacon signal and the reception Information (for example, reception power information, propagation loss information, or the like) in the storage unit 230.

The STA 200 continues processing of steps S1104 to S1120 described above until a predetermined scanning time elapses.

When the predetermined scanning time has elapsed (step S1104/Yes), the STA 200 ends the scanning of the peripheral AP 100 in step S1124. When one or more connection destination candidate APs 100 are detected (step S1128/Yes), in step S1132, the STA 200 succeeds in detecting the connection destination candidate AP 100, and ends the processing by determining the optimum connection destination using the information (for example, information included in the beacon signal, reception information of the beacon signal, or the like) stored in the storage unit 230. On the other hand, when the connection destination candidate AP 100 is not detected (step S1128/No), in step S1136, the STA 200 ends the processing by determining that the connection destination candidate AP 100 has failed. Note that the processing after step S1132 and step S1136 is as described with reference to FIG. 9. Further, in the example of FIG. 10, the scanning of the peripheral AP 100 is continued until the predetermined scanning time has elapsed, but the STA 200 may end the scanning of the peripheral AP 100 when one AP 100 is successfully detected.

(Flow of Processing by AP 100)

Figure 11:
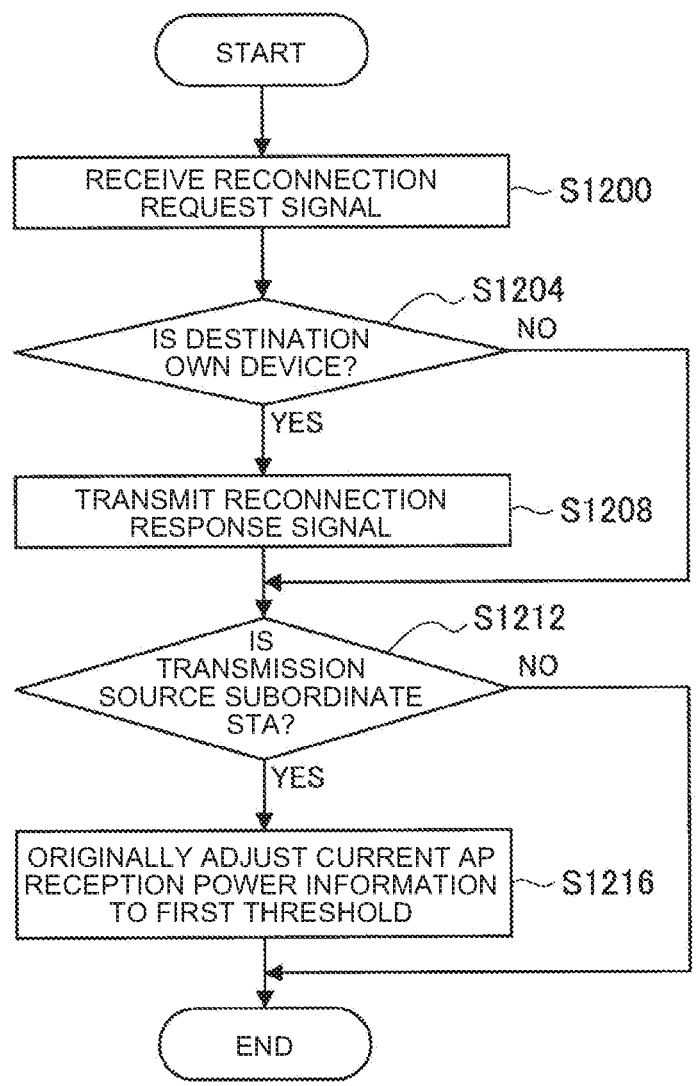
FIG. 11 is a flowchart illustrating an example of a flow of processing by the AP 100.

Next, an example of the flow of processing by the AP 100 will be described with reference to FIG. 11.

In step S1200, the AP 100 receives the reconnection request signal from any STA 200. Then, the AP 100 confirms the destination of the signal by analyzing the reconnection request signal. When the destination of the reconnection request signal is the own device (step S1204/Yes), in step S1208, the AP 100 determines whether or not the reconnection by the STA 200 is possible, and transmits the reconnection response signal including the determination result to the STA 200. On the other hand, when the destination of the reconnection request signal is not the own device (step S1204/No), the AP 100 does not transmit the reconnection response signal.

Next, the AP 100 confirms the transmission source of the signal by analyzing the reconnection request signal. When the transmission source of the signal is the STA 200 subordinate to the own device (step S1212/Yes), in step S1216, the AP 100 ends the processing by adjusting the first threshold based on the current AP reception power information (see FIG. 7) included in the reconnection request signal. On the other hand, when the transmission source of the signal is not the STA 200 subordinate to the own device (step S1212/No), the AP 100 ends the processing without adjusting the first threshold.

(Specific Example of Flow of Processing by AP 100 and STA 200)

Next, a specific example of the flow of processing by the AP 100 and the STA 200 will be described with reference to FIGS. 12 to 15.

Figure 12:
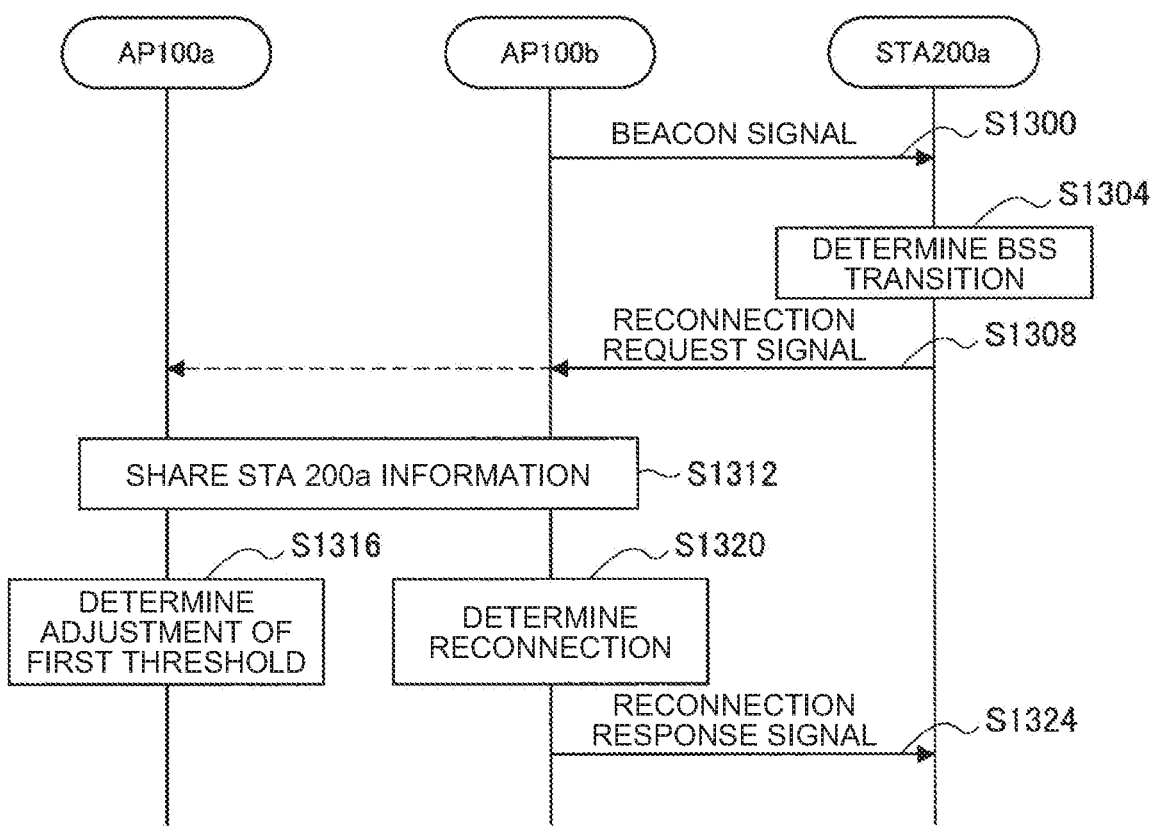
FIG. 12 is a sequence diagram illustrating an example of a flow of processing by the AP 100 and the STA 200.
Figure 13:
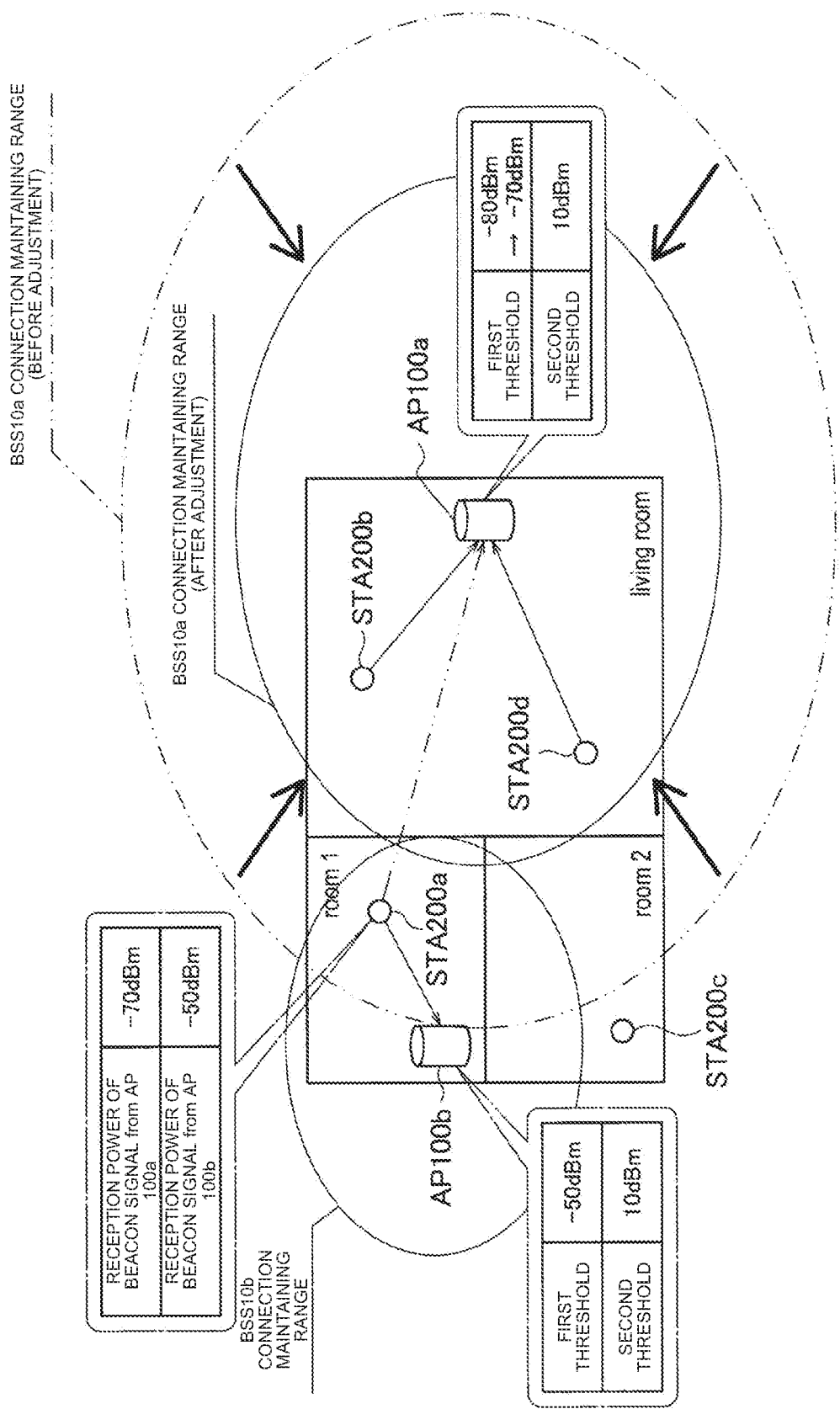
FIG. 13 is a diagram illustrating a specific example of the flow of processing by the AP 100 and the STA 200.

First, the case where an STA 200a transits the connection destination from an AP 100a to an AP 100b will be described with reference to FIGS. 12 and 13. FIG. 12 is a sequence diagram illustrating a series of processing for the BSS transition of the STA 200a. Note that in FIG. 13, the BSS formed by the AP 100a is denoted by "BSS 10a", and a range in which each STA 200 attempts to maintain connection in the BSS 10a is denoted by "BSS 10a connection maintaining range". In addition, the BSS formed by the AP 100b is denoted by "BSS 10b", and a range in which each STA 200 attempts to maintain connection in the BSS 10b is denoted by "BSS 10b connection maintaining range".

When the STA 200*a* receives the beacon signal from the AP 100*b* belonging to the same ESS in step S1300 in FIG. 12, in step S1304, the STA 200*a* determines whether to perform the BSS transition. For example, as illustrated in FIG. 13, it is assumed that the reception power of the beacon signal from the AP 100*a* to which the STA 200*a* is connected is −70 [dBm], and the reception power of the beacon signal from the AP 100*b* is −50 [dBm]. In addition, it is assumed that the first and second thresholds of the AP 100*a* is −80 [dBm] and 10 [dBm], respectively, and the first and second thresholds of AP 100*b* are −50 [dBm] and 10 [dBm].

In this case, since the reception power (−70 [dBm]) of the beacon signal from the connected AP 100*a* is greater than the first threshold (−80 [dBm]) of the AP 100*a*, according to the prior art, the STA 200*a* cannot perform the BSS transition by its own determination and maintains connection to AP 100*a*. On the other hand, in the present embodiment, since the difference between the reception power of the beacon signal from the AP 100*a* and the reception power of the beacon signal from the AP 100*b* is 20 [dBm] and is greater than the second threshold (10 [dBm]) set by AP 100*a*, the STA 200*a* can determine to perform the BSS transition.

Then, in step S1308 in FIG. 12, the STA 200*a* transmits the reconnection request signal to the AP 100*b*. Here, it is assumed that the reconnection request signal transmitted by the STA 200*a* is also received by the AP 100*a*. As a result, the AP100*b*, which has received the reconnection request signal, recognizes the AP 100*a* to which the STA 200*a* is connected, and in step S1312, acquires information (for example, authentication information or the like) on the STA 200*a* by communicating with the AP 100*a*.

Then, the AP 100*a* acquires the current AP reception power information included in the reconnection request signal in step S1316 by receiving the reconnection request signal addressed to the AP 100*b* transmitted from the subordinate STA 200*a* in the above processing, and can determine whether or not the first threshold needs to be adjusted using the information. For example, as illustrated in FIG. 13, since the current AP reception power information is greater than the first threshold set by the AP 100*a*, the AP 100*a* determines that the excessively low first threshold is set and adjusts the first threshold to the same value (−70 [dBm]) as the current AP reception power information. As a result, as illustrated in FIG. 13, the BSS 10*a* connection maintaining range is reduced.

Thereafter, the AP 100*b* determines in step S1320 in FIG. 12 whether or not the reconnection by the STA 200*a* is possible based on the information on the STA 200*a*, and in step S1324, ends a series of processing by transmitting the reconnection response signal including the determination result to the STA 200*a*. In this way, the STA 200*a* can transit to the BSS 10*b* having a better reception environment by allowing the AP 100*a* to set the second threshold, and the AP 100*a* can adjust the first threshold to a more appropriate value by the current AP reception power information included in the reconnection request signal.

Note that the above processing is merely an example, and the processing of each device may be changed as appropriate. For example, the AP 100*a* may set a value obtained by performing a predetermined calculation using the current AP reception power information to be the first threshold, without setting the same value (−70 [dBm]) as the current AP reception power information to be the first threshold. Further, the second threshold may be a threshold used for comparison with the ratio of these reception powers, instead of the difference in reception power of beacon signals from different APs 100.

Figure 14:
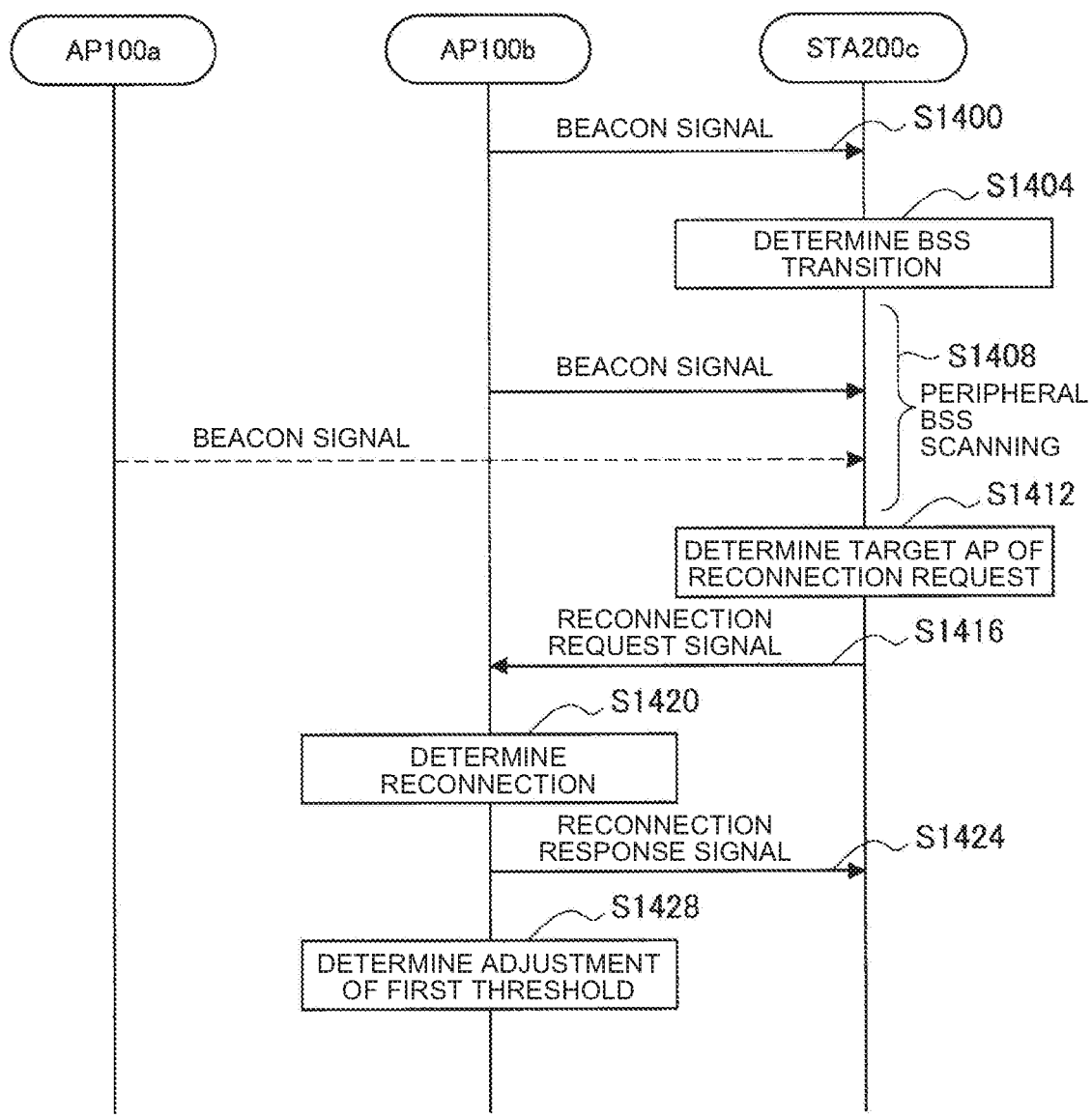
FIG. 14 is a sequence diagram illustrating an example of the flow of processing by the AP 100 and the STA 200.
Figure 15:
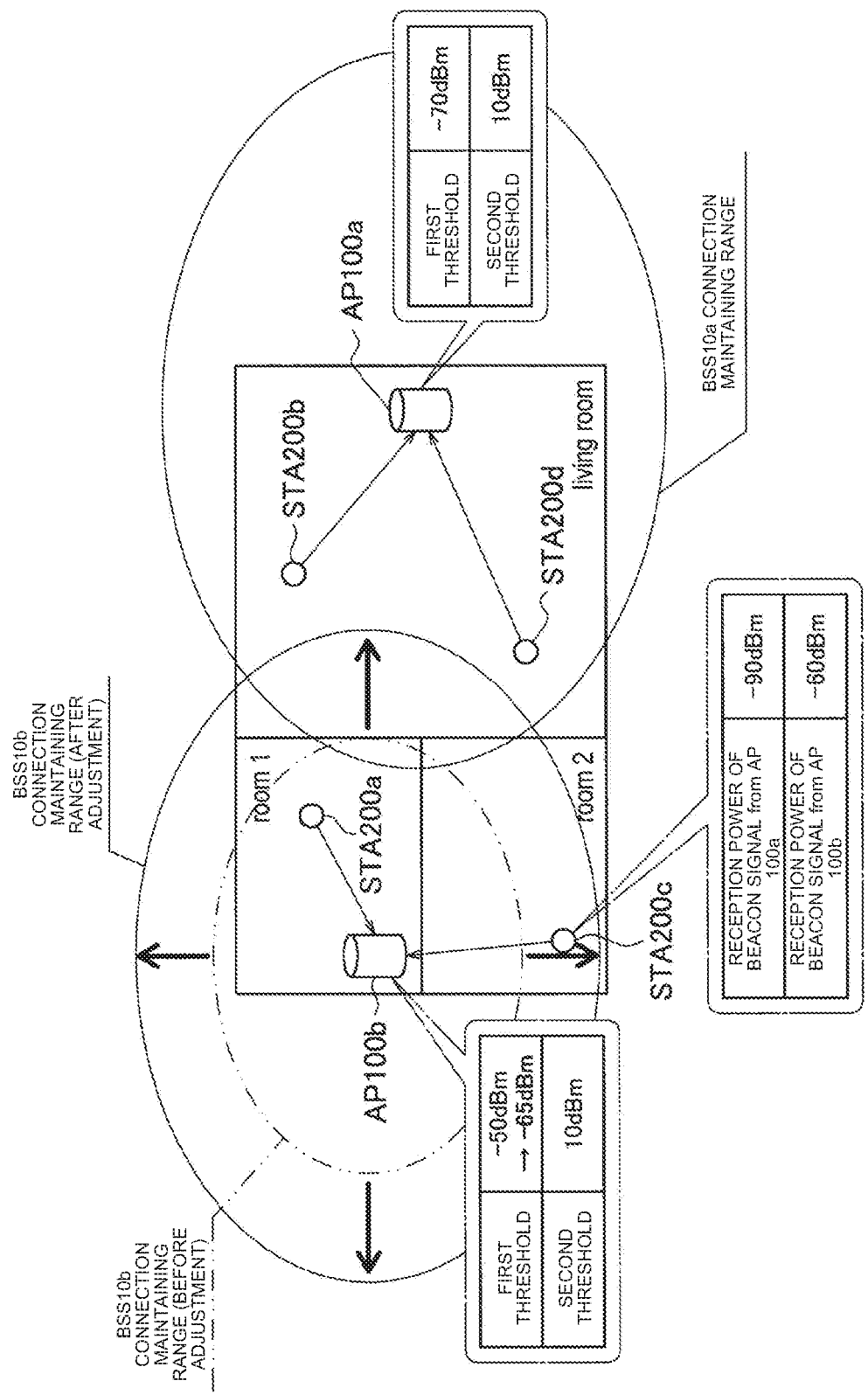
FIG. 15 is a diagram illustrating a specific example of the flow of processing by the AP 100 and the STA 200.

Next, the case where the AP 100*b* adjusts the first threshold will be described with reference to FIGS. 14 and 15. Here, it is assumed that an STA 200*c* is connected to the AP 100*b* before the processing of step S1400 in FIG. 14 is performed.

When the STA 200*c* receives the beacon signal from the connected AP 100*b* in step S1400, the STA 200*c* determines in step S1404 whether or not to transit to the BSS. For example, as illustrated in FIG. 15, it is assumed that the reception power of the beacon signal from the AP 100*b* to which the STA 200*c* is connected is −60 [dBm], and the reception power of the beacon signal from the AP 100*a* is −90 [dBm]. In addition, it is assumed that the first threshold and the second threshold of the AP 100*b* are −50 [dBm] and 10 [dBm], respectively.

In this case, the reception power (−60 [dBm]) of the beacon signal from the connected AP 100*b* is smaller than the first threshold (−50 [dBm]) of the AP 100*b*, so the STA 200*c* determines to perform the BSS transition. Then, in step S1408 in FIG. 14, the STA 200*c* scans the peripheral AP 100 that is the candidate for the connection destination in order to attempt the transition to another BSS, but cannot detect another AP 100 of which the reception power of the beacon signal is higher than that of the AP 100*b*. Therefore, the STA 200*c* determines the AP 100*b* as the target of the reconnection request in step S1412, and transmits the reconnection request signal to the AP 100*b* in step S1416. Then, the AP 100*b* determines in step S1420 that the reconnection by the STA 200*c* is possible, and transmits the reconnection response signal including the determination result to the STA 200*c* in step S1424. As a result, the connection of the STA 200*c* to the AP 100*b* is maintained.

However, since the reception power (−60 [dBm]) of the beacon signal from the connected AP 100*b* is still smaller than the first threshold (−50 [dBm]) of the AP 100*b*, according to the prior art, the STA 200*c* determines to perform the BSS transition again, and the processing of steps S1408 to S1424 is repeated.

On the other hand, in the present embodiment, the AP 100*b* acquires the current AP reception power information included in the reconnection request signal in step S1428 based on the fact that the reconnection request signal is received from the subordinate STA 200*c*, and determines whether it is necessary to adjust its own first threshold. More specifically, as illustrated in FIG. 15, since the current AP reception power information (−60 [dBm]) included in the reconnection request signal from the STA 200*c* is equal to or lower than the first threshold (−50 [dBm]) of the AP 100*b*, the AP 100*b* determines that the excessively high first threshold is set, and adjusts the first threshold to a lower value using the current AP reception power information. For example, the AP 100*b* sets a value (−65 [dBm]) lower than the current AP reception power information (−60 [dBm]) by a predetermined value to be the first threshold. As a result, as illustrated in FIG. 15, the BSS 10*b* connection maintaining range becomes large and the STA 200*c* is located within the BSS 10*b* connection maintaining range, so the BSS transition processing by the STA 200*c* is not repeated. In this way, the AP 100*b* can adjust its own first threshold to a more appropriate value by receiving the reconnection request signal including the current AP reception power information from the subordinate STA 200*c*.

Note that the above processing is merely an example, and the processing of each device may be changed as appropriate. For example, the AP 100b may adjust the first threshold only when the number of times (or the frequency, or the like) of receiving the reconnection request signal from the subordinate STA 200c exceeds a predetermined value. As a result, the AP 100b can stabilize the first threshold.

3. SECOND EMBODIMENT

The first embodiment of the present disclosure has been described above. Next, a second embodiment of the present disclosure will be described.

Although the method of adjusting a first threshold has been described in the first embodiment, there is an AP 100 that is not intended to cover a wide range depending on the product. For such an AP 100, the first threshold cannot be easily reduced because the coverage area is limited. Therefore, the AP 100 according to the second embodiment sets a minimum value of the first threshold, and an STA 200 uses the minimum value to determine whether or not BSS transfer is possible.

Figure 16:
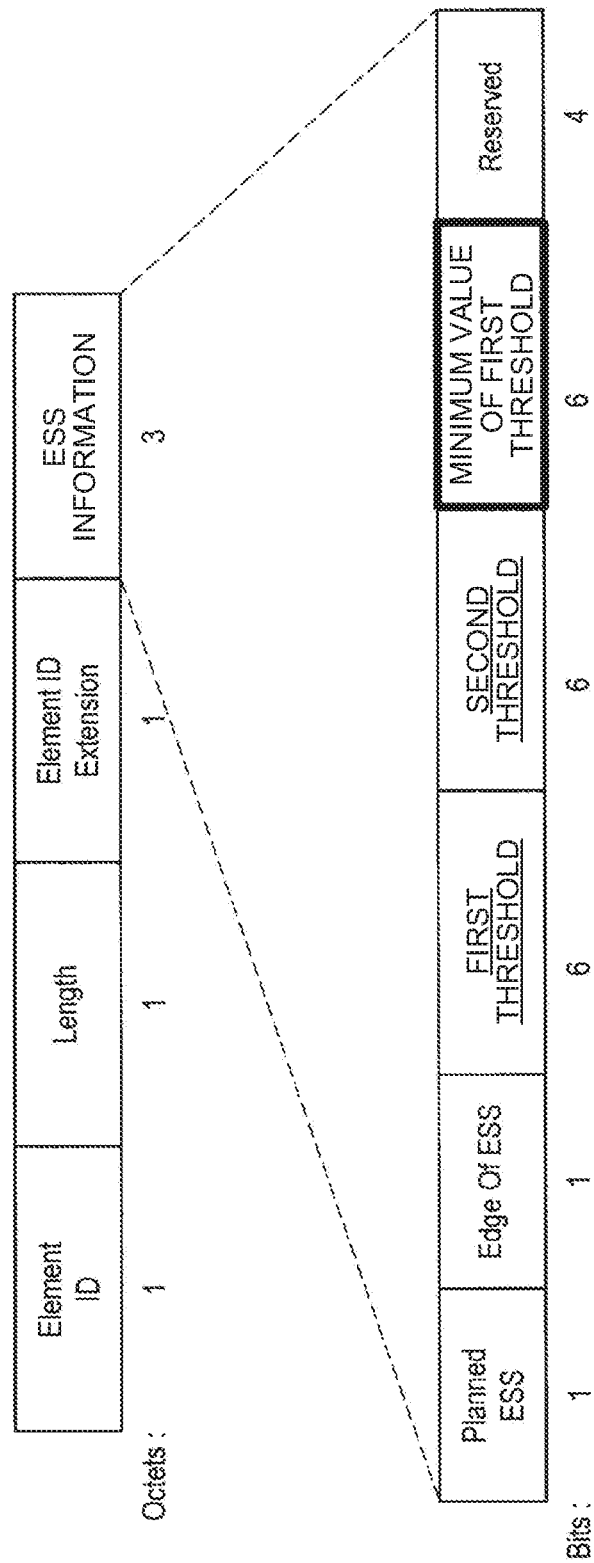
FIG. 16 is a diagram illustrating a configuration example of the ESS report element in the beacon signal transmitted from the AP 100 to each STA 200.

First, a configuration example of an ESS report element according to the present embodiment will be described with reference to FIG. 16. As illustrated in FIG. 16, the AP 100 according to the present embodiment notifies the STA 200 of the minimum value of the first threshold by setting the minimum value of the first threshold at a later stage of a second threshold in ESS information on the ESS report element. Note that other elements are the same as the ESS report element (see FIG. 6) according to the first embodiment. In addition, the configuration of the ESS report element according to the present embodiment is not limited to the example of FIG. 16. For example, a data position where the minimum value of the first threshold is set may be changed as appropriate.

Next, an example of a flow of processing by the STA 200 according to the present embodiment will be described with reference to FIG. 17. A difference from the example (see FIG. 9) of the flow of processing by the STA 200 according to the first embodiment is that it is determined in step S1536 whether the reception power of the beacon signal is greater than the minimum value of the first threshold included in the ESS report element of the beacon signal when the STA 200 receives a beacon signal from another AP 100 that belongs to the same ESS (step S1532/Yes). When the reception power of the beacon signal is greater than the minimum value of the first threshold (step S1536/Yes), similar to the first embodiment, the STA 200 transmits a reconnection request signal or the like to the AP 100, which is the transmission source of the beacon signal, by performing processing after step S1540.

Next, in step S1516 in FIG. 17, details of processing of scanning a peripheral APs 100 that is a candidate for a connection destination in order to attempt for the STA 200 to transit to another BSS will be described with reference to FIG. 18. The difference from the first embodiment (see FIG. 10) is that it is determined in step S1620 whether the reception power of the beacon signal is greater than the minimum value of the first threshold when the STA 200 receives a beacon signal from any AP 100 by scanning (step S1608/Yes). When the reception power of the beacon signal is greater than the minimum value of the first threshold (step S1620/Yes), similar to the first embodiment, the STA 200 handles the transmission source of the beacon signal as a connection destination candidate AP 100 in step S1624. Note that in step S1620, the minimum value of the first threshold is acquired from the ESS report element in the beacon signal received by the STA 200 as described above.

Figure 19:
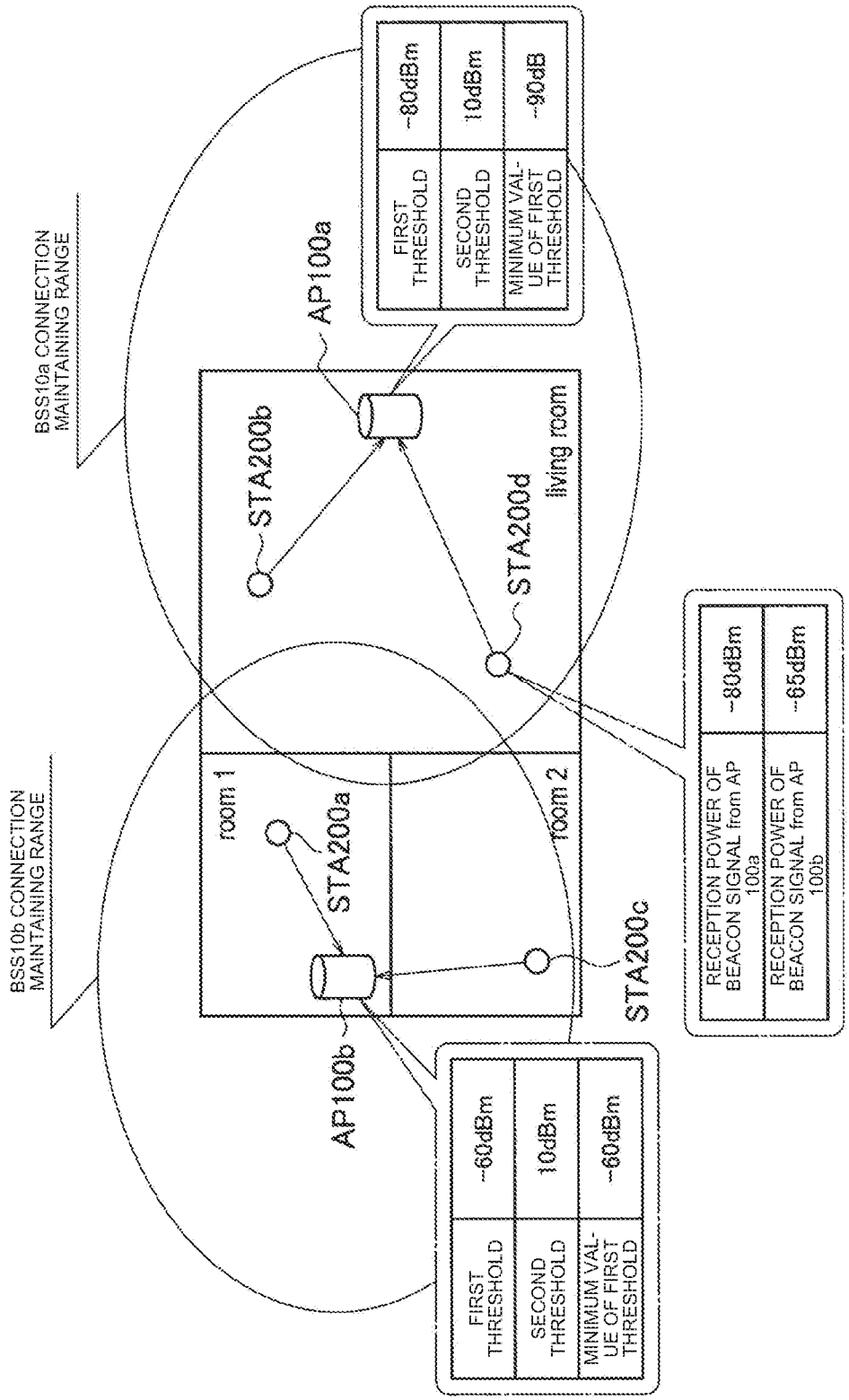
FIG. 19 is a diagram illustrating a specific example of the flow of processing by the AP 100 and the STA 200.

Next, a specific example of processing in the case where an STA 200d connected to an AP 100a receives a beacon signal from an AP 100b will be described with reference to FIG. 19. As illustrated in FIG. 19, it is assumed that the reception power of the beacon signal from the AP 100a to which the STA 200d is connected is −80 [dBm], and the reception power of the beacon signal from the AP 100b is −65 [dBm]. In addition, it is assumed that the first threshold, the second threshold, and the minimum value of the first threshold of AP 100a are −80 [dBm], 10 [dBm], and −90 [dBm], respectively, and the first threshold, the second threshold, and the minimum value of the first threshold of the AP 100b are −60 [dBm], 10 [dBm], and −60 [dBm], respectively.

In this case, the difference between the reception power (−80 [dBm]) of the beacon signal from the AP 100a and the reception power (−65 [dBm]) of the beacon signal from the AP 100b is 15 [dBm], and is greater than the second threshold (10 [dBm]) set by the AP 100a. Therefore, in the first embodiment, the STA 200d transmits the reconnection request signal to the AP 100b. On the other hand, in the present embodiment, the STA 200d compares the minimum value of the first threshold notified by the AP 100b with the reception power of the beacon signal before comparing the difference from the reception power with the second threshold (see step S1536 in FIG. 17). In this case, since the reception power (−65 [dBm]) of the beacon signal from the AP 100b is equal to or lower than the minimum value (−60 [dBm]) of the first threshold notified by the AP 100b, the STA 200d determines that the AP 100b cannot extend a BSS 10b connection maintaining range up to a position of the own device. Therefore, the STA 200d abandons the transition to the AP 100b and continues to connect to the AP 100a. As described above, the AP 100b according to the present embodiment can prevent the BSS 10b connection maintaining range from being expanded beyond its own capability by setting the minimum value of the first threshold.

Note that the above processing is merely an example, and the processing of each device may be changed as appropriate. For example, the AP 100b may set the minimum value of the first threshold to be a fixed value or a variable value that can be dynamically changed. More specifically, when the AP 100b is a device capable of dynamically controlling transmission power, the AP 100b may change the minimum value of the first threshold according to the transmission power. In addition, the AP 100b may control the BSS transition of the STA 200d by providing the maximum value of the first threshold instead of the minimum value of the first threshold.

4. THIRD EMBODIMENT

The second embodiment of the present disclosure has been described above. Next, a third embodiment of the present disclosure will be described.

In the first and second embodiments, the method of adjusting the first threshold has been mainly described. On the other hand, the second threshold may be a fixed value defined for each product, or may be a variable value that can be dynamically changed according to the communication environment. Therefore, in the third embodiment, an example of the case where the AP 100 adjusts the second threshold will be described. For example, the AP 100 may dynamically adjust the second threshold according to the communication status (for example, channel usage rate) of another AP 100 belonging to the same ESS. Here, the channel usage rate is assumed to be a rate of time when communication is actually performed in a predetermined measurement time, but is not limited thereto.

Figure 20:
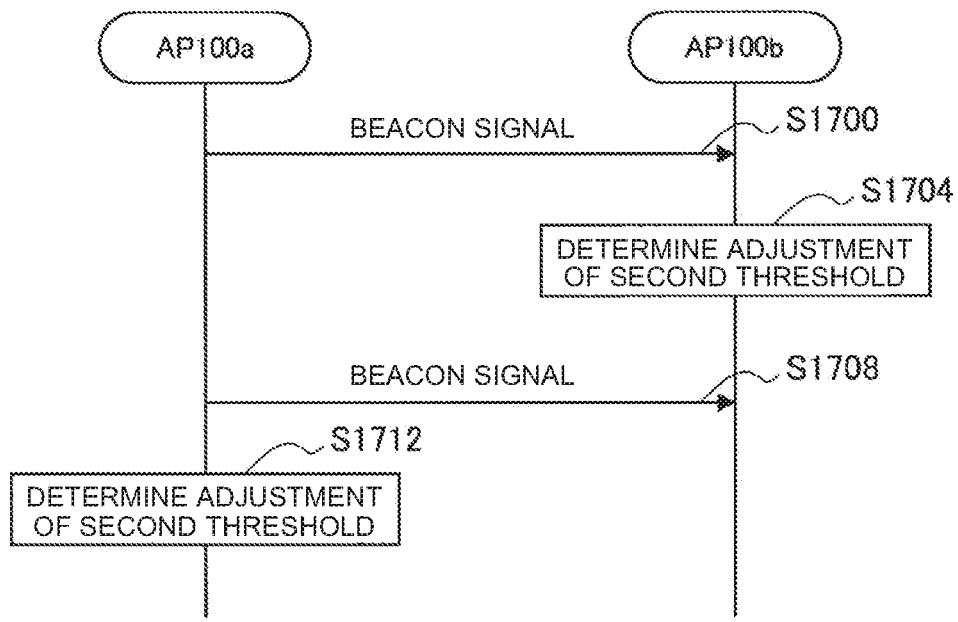
FIG. 20 is a sequence diagram illustrating an example of a flow of communication processing between the APs 100.

First, an example of communication processing between the APs 100 to the present embodiment will be described with reference to FIG. 20. For example, the AP 100*a* and the AP 100*b* communicate a beacon signal including channel usage rate information with each other in step S1700 and step S1708 to determine in step S1704 and step S1712 whether or not to their second thresholds according to the channel usage rate information or the like that is included in the received beacon signal. When the AP 100*a* and the AP 100*b* are not located in a range in which the AP 100*a* and the AP 100*b* can receive each other's beacon signals, both the APs 100 can perform communication via an external device such as STA 200 that can receive both signals. The AP 100*a* and the AP 100*b* may share the channel usage rate information or the like with each other by a wireless signal other than the beacon signal or wired communication.

Figure 21:
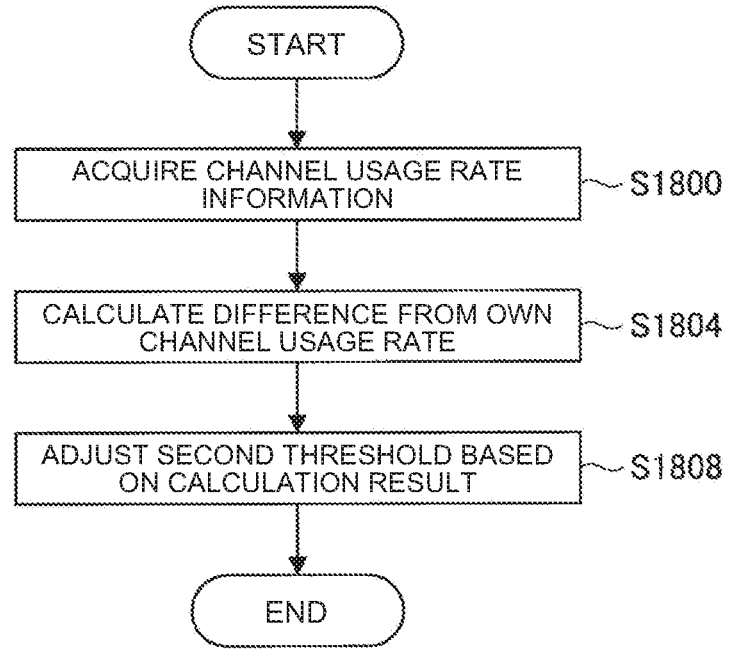
FIG. 21 is a flowchart illustrating an example of a flow of processing of adjusting a second threshold.

Next, an example of the processing of adjusting the second threshold by the AP 100 will be described with reference to FIG. 21. In step S1800 in FIG. 21, the AP 100 acquires the channel usage rate information included in the beacon signal from another AP 100. Then, the AP 100 calculates a difference between the channel usage rate of another AP 100 and its own channel usage rate in step S1804, and adjusts its own second threshold based on the calculation result in step S1808. For example, when the channel usage rate of another AP 100 is higher than that of the AP 100, the AP 100 may adjust its own second threshold to a higher value to suppress the transition of the STA 200 to the BSS formed by another AP 100. In addition, conversely, when the channel usage rate of another AP 100 is equal to or lower than that of the AP 100, the AP 100 may adjust its own second threshold to a lower value to promote the transition of the STA 200 to the BSS formed by another AP 100.

Figure 22:
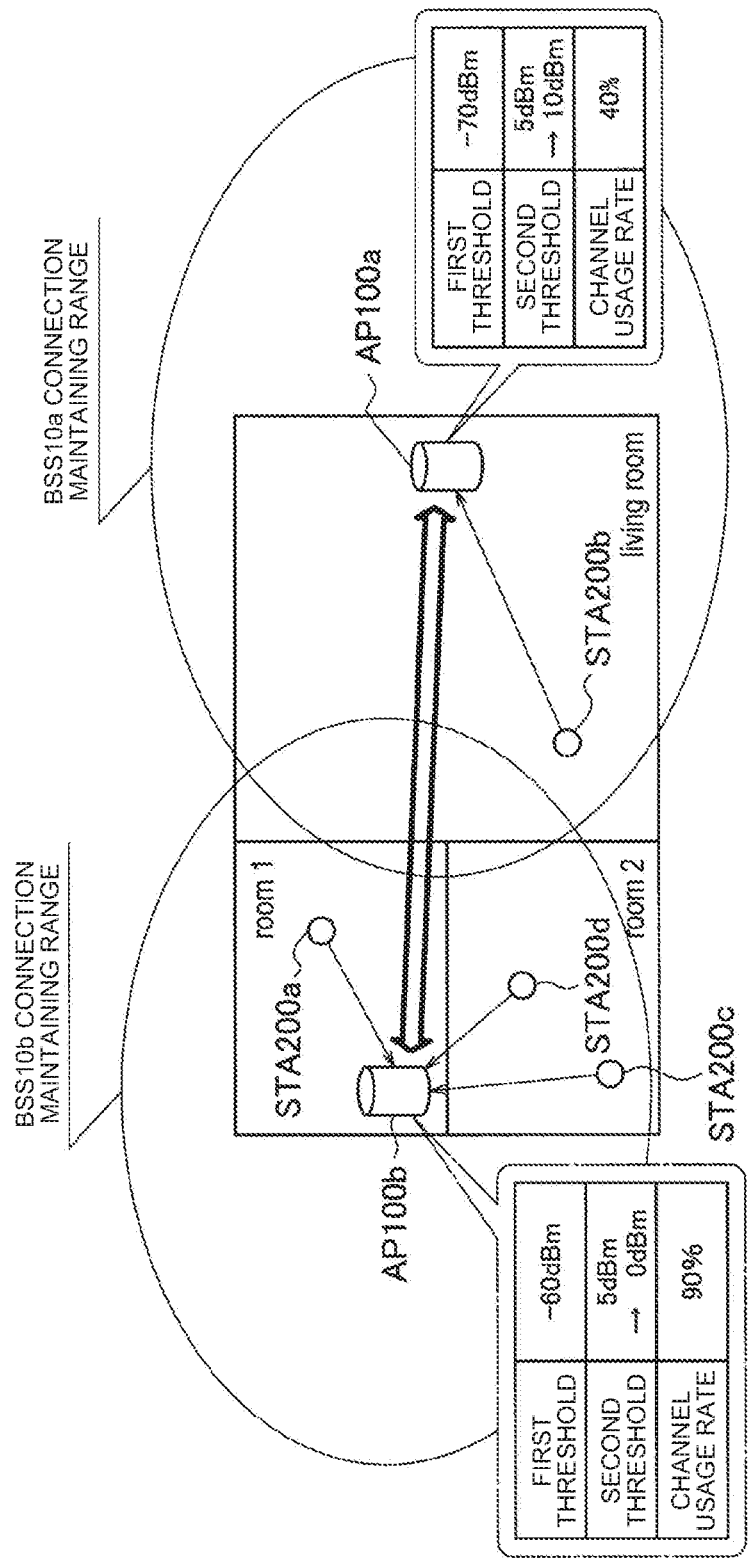
FIG. 22 is a diagram illustrating a specific example of the flow of processing by the AP 100 and the STA 200.

Next, a specific example of the case where the AP 100*a* and the AP 100*b* adjust the second threshold will be described with reference to FIG. 22. As illustrated in FIG. 22, it is assumed that the second threshold and the channel usage rate of the AP 100*a* are 5 [dBm] and 90 [%], respectively, and the second threshold and the channel usage rate of the AP 100*b* are 5 [dBm] and 40 [%], respectively. The AP 100*a* and the AP 100*b* recognize the channel usage rate of the other party by communicating the beacon signal including the channel usage rate information with each other. In this case, since the AP 100*b* has the channel usage rate higher than that of the AP 100*a*, the AP 100*a* adjusts the second threshold to a higher value (for example, 10 [dBm]) to suppress the transition of the STA 200 to the BSS 10*b* formed by the AP 100*b*. On the other hand, the AP 100*b* adjusts the second threshold to a lower value (for example, 0 [dBm]) to promote the transition of the STA 200 to the BSS 10*a* formed by the AP 100*a*. As a result, each STA 200 can transit to a more appropriate BSS according to the channel usage rate of each AP 100.

Note that the above processing is merely an example, and the processing of each device may be changed as appropriate. For example, the AP 100 may adjust the second threshold based on information other than the channel usage rate (for example, the number of subordinate STAs 200) as long as the information indicates the degree of congestion of communication of each BSS. Further, the setting value of the second threshold can be determined by any method. For example, the AP 100 may set the value obtained by performing a predetermined calculation using the difference from the channel usage rate of another AP 100 to be the second threshold.

5. FOURTH EMBODIMENT

The third embodiment of the present disclosure has been described above. Next, a fourth embodiment of the present disclosure will be described.

Figure 23:
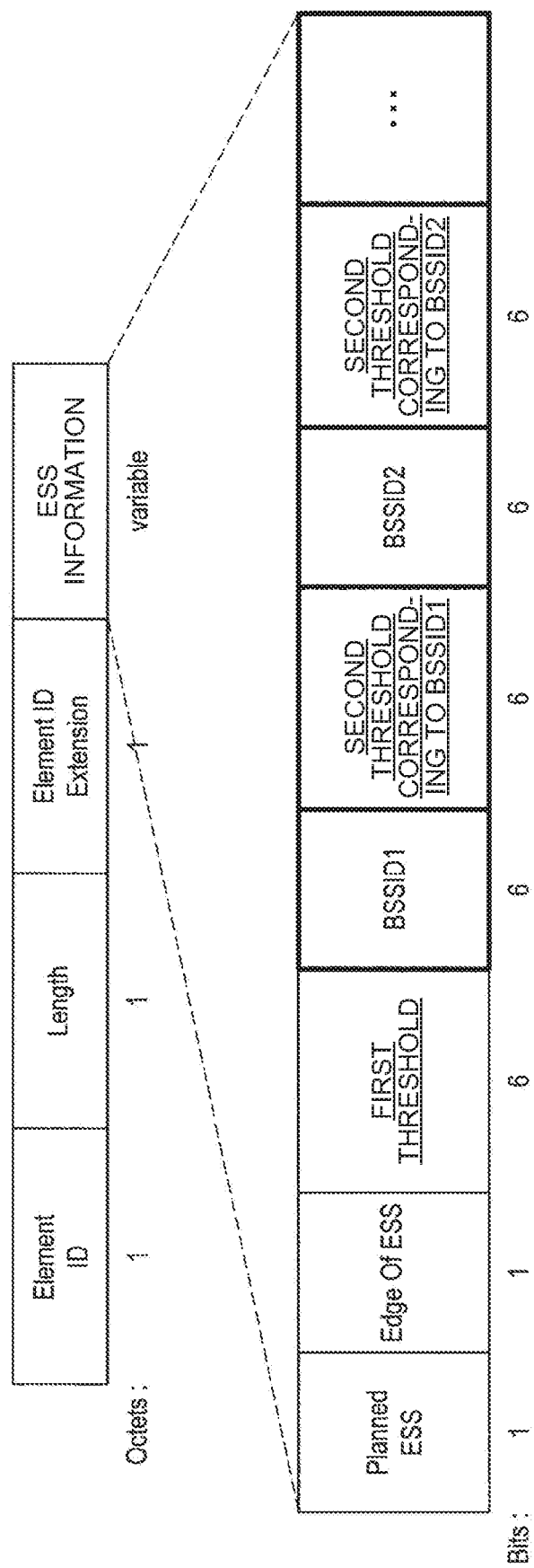
FIG. 23 is a diagram illustrating a configuration example of the ESS report element in the beacon signal transmitted from the AP 100 to each STA 200.

An AP 100 according to the fourth embodiment stores a second threshold corresponding to each BSSID in an ESS report element. More specifically, as illustrated in FIG. 23, the AP 100 provides the arbitrary number of pairs of BSSID and second thresholds corresponding to the BSSID at a later stage of a first threshold in the ESS report element.

Figure 9:
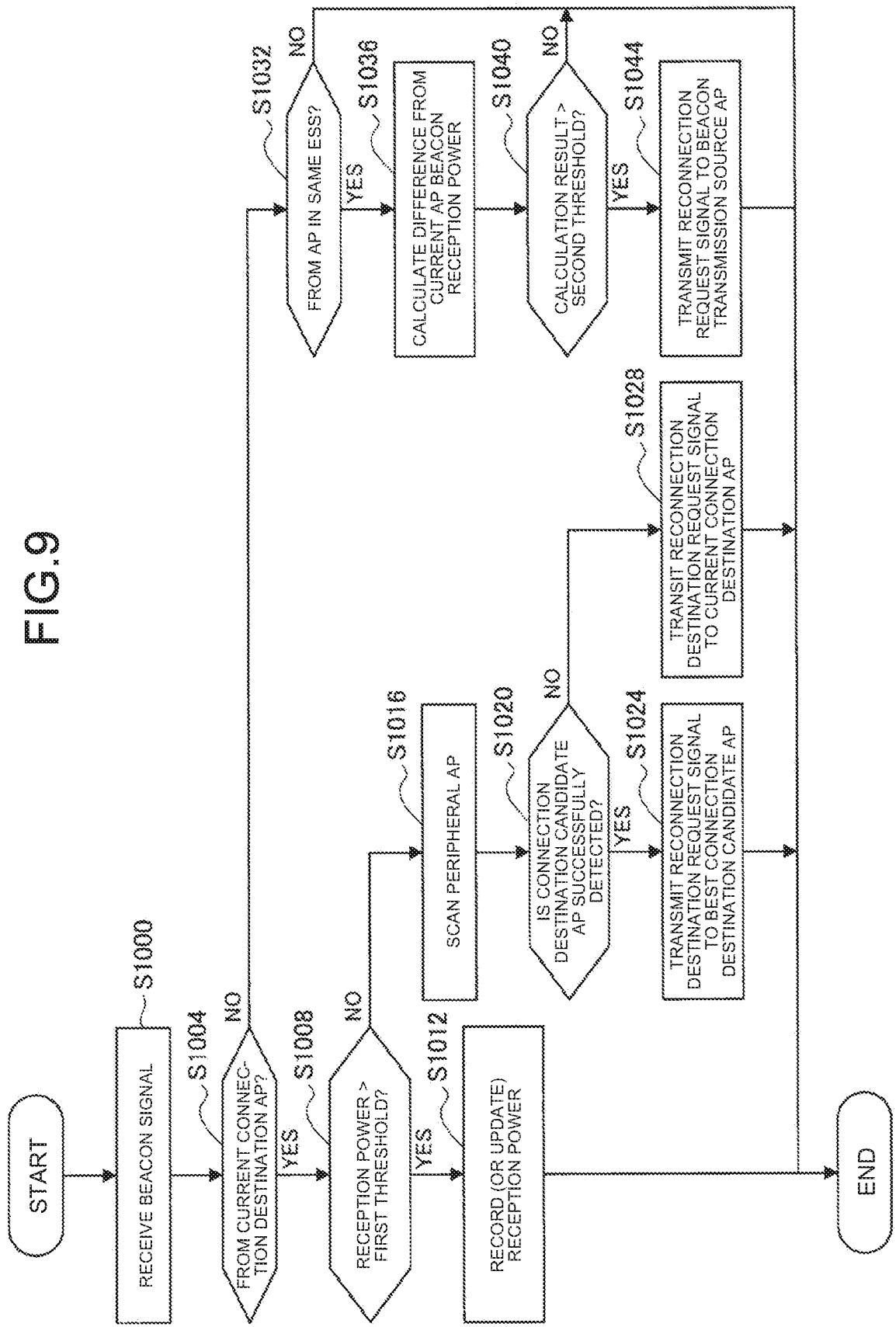
FIG. 9 is a flowchart illustrating an example of a flow of processing by the STA 200.
Figure 17:
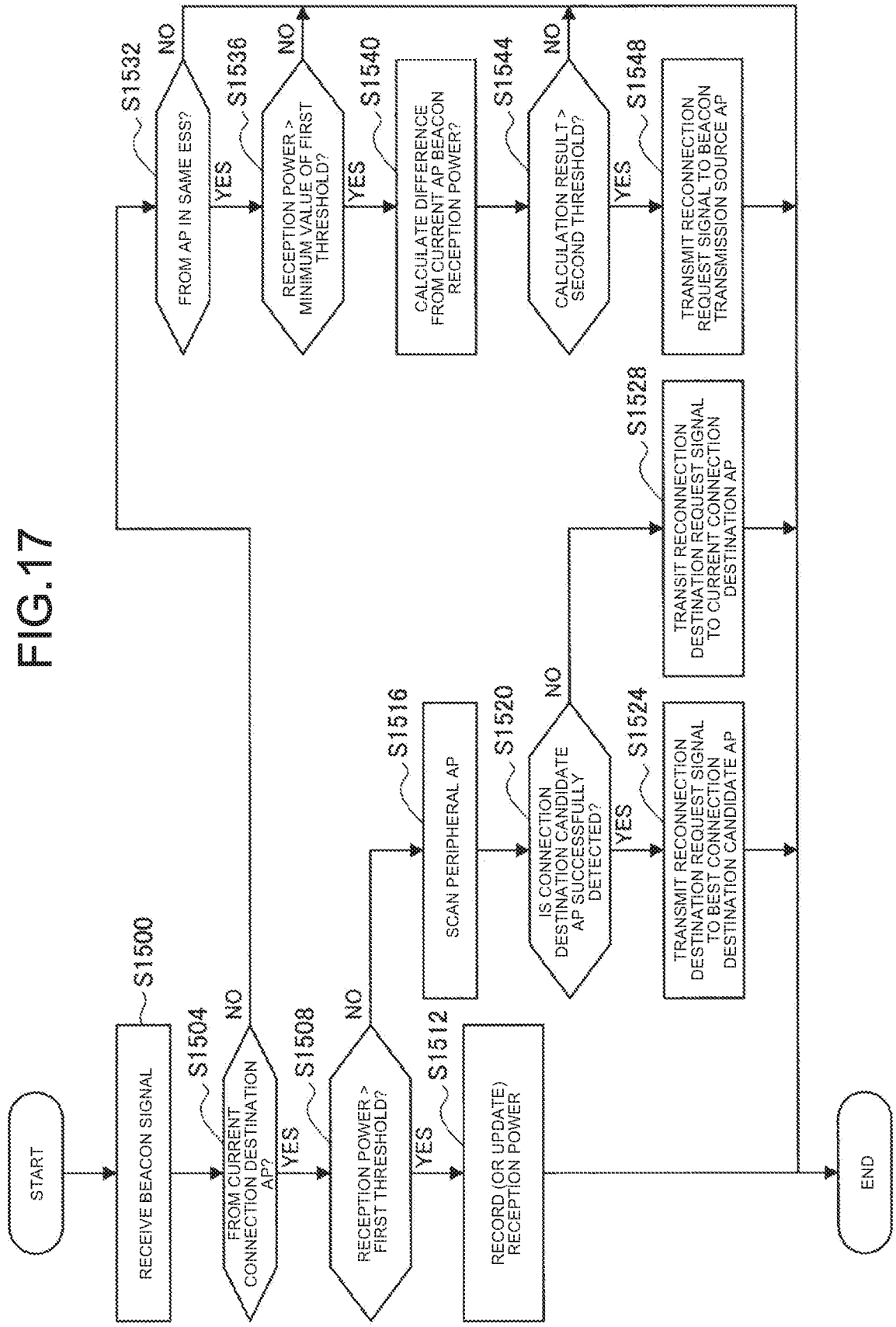
FIG. 17 is a flowchart illustrating an example of a flow of processing by the STA 200.
Figure 18:
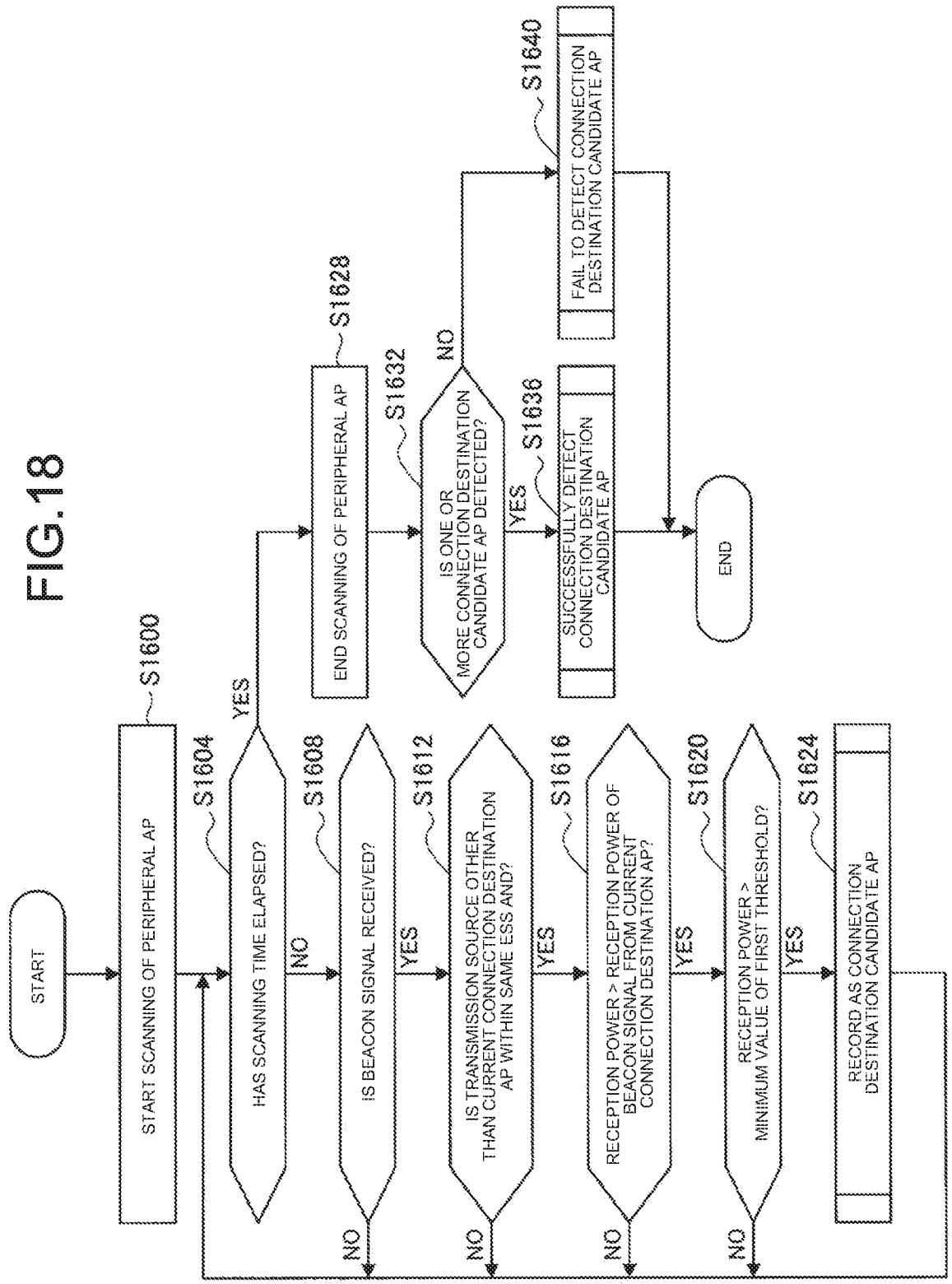
FIG. 18 is a flowchart illustrating an example of a flow of processing in which the STA 200 scans the peripheral AP 100 that is the candidate for the connection destination.

Then, in step S1040 in FIG. 9 or step S1544 in FIG. 17, when the difference in reception power between the current connection destination AP 100 and another AP 100 compares with the second threshold, the STA 200 that receives the ESS report element does not use a uniform second threshold, but can use the second threshold depending on the BSS formed by another AP 100. In addition, in step S1808 in FIG. 21, when the second threshold is adjusted based on the difference in the channel usage rate between the own device and another AP 100, the AP 100 can adjust the second threshold corresponding to the BSS formed by another AP 100. In this way, the AP 100 can control the BSS transition by the STA 200 more finely by managing the second thresholds for each BSSID (in other words, for each BSS). Note that the processing and the configuration of the ESS report element according to this embodiment are not limited to those described above.

6. APPLICATION EXAMPLE

The technology according to the present disclosure can be applied to various products. For example, the STA 200 may be realized as a mobile terminal such as a smartphone, a tablet personal computer (PC), a notebook PC, a portable game terminal, or a digital camera, a fixed terminal such as a television receiver, a printer, a digital scanner or a network storage, or an in-vehicle terminal such as a car navigation device. Further, the STA 200 is realized as a terminal (also referred to as a machine type communication (MTC) terminal) that performs machine to machine (M2M) communication, such as a smart meter, a vending machine, a remote monitoring device, or a point of sale (POS) terminal. In addition, the STA 200 may be a wireless communication module (for example, an integrated circuit module configured by one die) that is mounted on these terminals.

On the other hand, for example, the AP 100 may be realized as a wireless LAN access point (also referred to as a wireless base station) that has a router function or does not have a router function. In addition, the AP 100 may be realized as a mobile wireless LAN router. In addition, the AP 100 may be the wireless communication module (for example, an integrated circuit module configured by one die) that is mounted on these devices.

6.1. First Application Example

Figure 24:
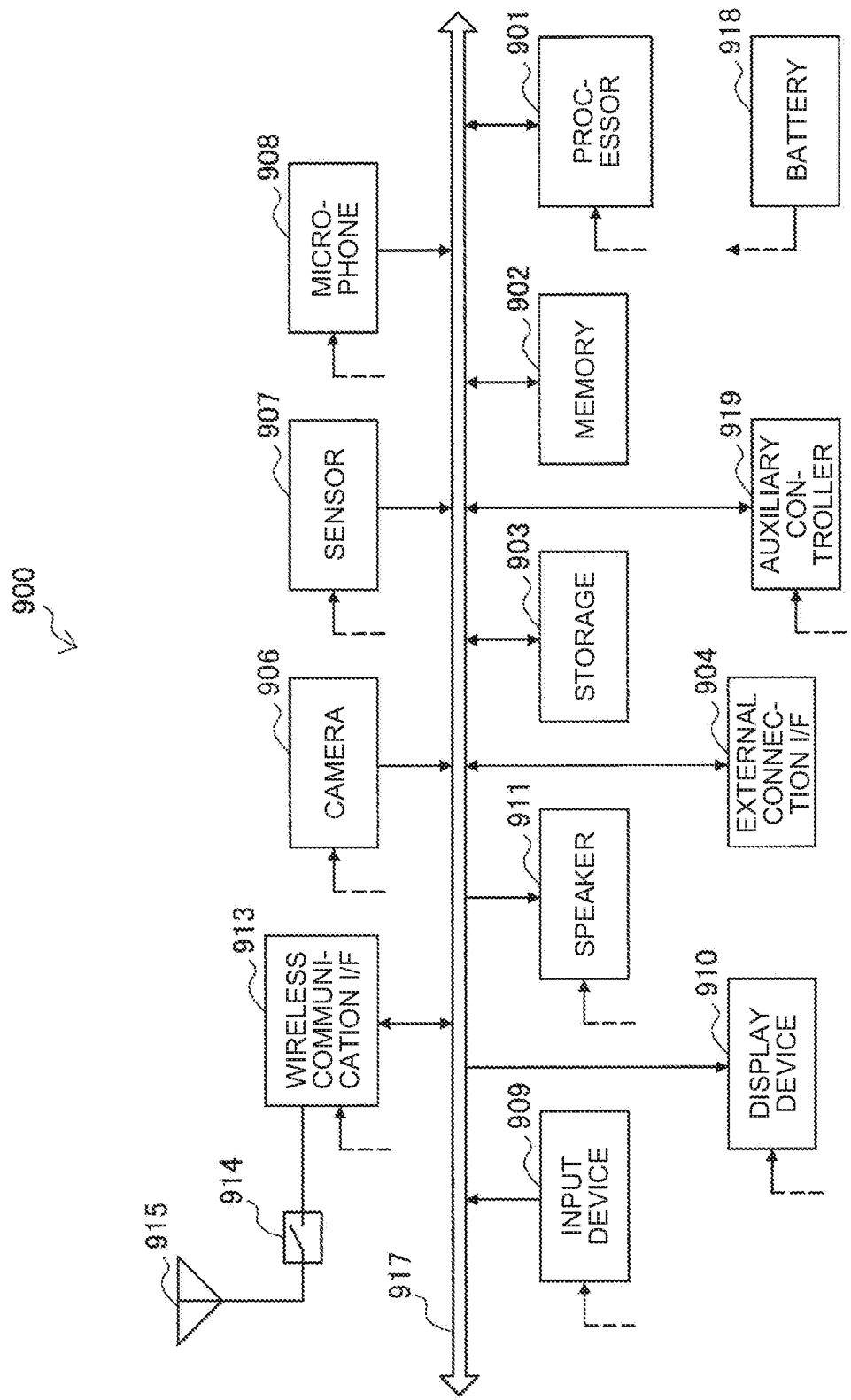
FIG. 24 is a block diagram illustrating an example of a schematic configuration of a smartphone.

FIG. 24 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs and data executed by the processor 901. The storage 903 may include a storage medium such as a semiconductor memory or a hard disk. The external connection interface 904 is an interface that connects an external device such as a memory card or a universal serial bus (USB) device to the smartphone 900.

The camera 906 has an imaging element such as a charge coupled device (CCD) or a complementary metal oxide semiconductor (CMOS), and generates a captured image. The sensor 907 may include a group of sensors such as a positioning sensor, a gyro sensor, a geomagnetic sensor, and an acceleration sensor. The microphone 908 converts audio input to the smartphone 900 into an audio signal. The input device 909 includes, for example, a touch sensor that detects a touch on a screen of the display device 910, a keypad, a keyboard, a button, a switch, or the like and receives an operation or information input from a user. The display device 910 has a screen such as a liquid crystal display (LCD) or an organic light emitting diode (OLED) display, and displays an output image of the smartphone 900. The speaker 911 converts an audio signal output from the smartphone 900 into audio.

The wireless communication interface 913 supports one or more of wireless LAN standards such as IEEE 802.11a, 11b, 11g, 11n, 11ac, 11ad, and 11ax, and executes wireless communication. The wireless communication interface 913 can communicate with other devices via a wireless LAN access point in an infrastructure mode. In addition, the wireless communication interface 913 can directly communicate with another device in an ad hoc mode or a direct communication mode such as Wi-Fi Direct (registered trademark). Note that in the Wi-Fi Direct, one of the two terminals operates as an access point, unlike the ad hoc mode, but the communication is directly performed between these terminals. The wireless communication interface 913 can typically include a baseband processor, a radio frequency (RF) circuit, a power amplifier, and the like. The wireless communication interface 913 may be a one-chip module in which a memory that stores a communication control program, a processor that executes the program, and related circuits are integrated. The wireless communication interface 913 may support other types of wireless communication schemes such as a short-range wireless communication scheme, a close proximity wireless communication scheme, and a cellular communication scheme, in addition to a wireless LAN scheme. The antenna switch 914 switches a connection destination of the antenna 915 among a plurality of circuits (for example, circuits for different wireless communication schemes) included in the wireless communication interface 913. Each antenna 915 has a single or a plurality of antenna elements (for example, a plurality of antenna elements forming a MIMO antenna), and is used to transmit and receive a wireless signal by the wireless communication interface 913.

Note that the smartphone 900 is not limited to the example of FIG. 24, and may include a plurality of antennas (for example, an antenna for the wireless LAN and an antenna for the close proximity wireless transfer scheme). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to each block of the smartphone 900 illustrated in FIG. 24 via a power supply line partially indicated by a broken line in the drawing. The auxiliary controller 919 operates required minimum functions of the smartphone 900 in a sleep mode, for example.

In the smartphone 900 illustrated in FIG. 24, the processor 901 may function as the control unit 220 of the STA 200. For example, the processor 901 may control the connection processing to the AP 100 based on the reception information (for example, reception power information, propagation loss information, or the like) of the beacon signal from the AP 100, the first threshold, the second threshold, and the like.

Note that the smartphone 900 may operate as a radio access point (software AP) by allowing the processor 901 to execute the access point function at an application level. Further, the wireless communication interface 913 may have the radio access point function.

6.2. Second Application Example

FIG. 25 is a block diagram illustrating an example of a schematic configuration of the car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC, and controls a navigation function and other functions of the car navigation device 920. The memory 922 includes a RAM and a ROM, and stores programs and data executed by the processor 921.

The GPS module 924 measures positions (for example, latitude, longitude, and altitude) of the car navigation device 920 using a GPS signal received from a GPS satellite. The sensor 925 may include a group of sensors such as a gyro sensor, a geomagnetic sensor, and an air pressure sensor. The data interface 926 is connected to the in-vehicle network 941 via a terminal (not illustrated), for example, and acquires data generated on a vehicle side such as vehicle speed data.

The content player 927 plays a content stored in a storage medium (for example, CD or DVD) inserted into the storage medium interface 928. The input device 929 includes, for example, a touch sensor that detects a touch on a screen of the display device 930, a button, a switch, or the like and receives an operation or information input from a user. The display device 930 has a screen such as an LCD or an OLED display, and displays a navigation function or an image of a content to be played. The speaker 931 outputs the navigation function or the audio of the content to be played.

The wireless communication interface 933 supports one or more of wireless LAN standards such as IEEE 802.11a, 11b, 11g, 11n, 11ac, 11ad, and 11ax, and executes wireless communication. The wireless communication interface 933 can communicate with other devices via a wireless LAN access point in an infrastructure mode. In addition, the wireless communication interface 933 can directly communicate with another device in an ad hoc mode or a direct communication mode such as Wi-Fi Direct. The wireless communication interface 933 can typically include a baseband processor, a radio frequency (RF) circuit, a power amplifier, and the like. The wireless communication interface 933 may be a one-chip module in which a memory that stores a communication control program, a processor that executes the program, and related circuits are integrated. The wireless communication interface 933 may support other types of wireless communication schemes such as a short-range wireless communication scheme, a close proximity wireless communication scheme, and a cellular communication scheme, in addition to a wireless LAN scheme. The antenna switch 934 switches the connection destination of the antenna 935 among a plurality of circuits included in the wireless communication interface 933. The antenna 935 has a single or a plurality of antenna elements, and is used for transmitting and receiving a wireless signal by the wireless communication interface 933.

Note that the car navigation device 920 is not limited to the example of FIG. 25, and may include a plurality of antennas. In this case, the antenna switch 934 may be omitted from the configuration of the car navigation device 920.

The battery 938 supplies power to each block of the car navigation device 920 illustrated in FIG. 25 via a power supply line partially indicated by a broken line in the drawing. In addition, the battery 938 stores power supplied from the vehicle side.

In the car navigation device 920 illustrated in FIG. 25, the processor 921 may function as the control unit 220 of the STA 200. The operation of the processor 921 functioning as the control unit 220 is similar to the operation of the processor 901 of the smartphone 900 described with reference to FIG. 24.

Further, the wireless communication interface 933 may operate as the above-described AP 100 and provide a wireless connection to a terminal owned by a user boarding a vehicle. At this time, for example, the wireless communication interface 933 may set the first threshold and the second threshold, and may integrally control the generation processing and the transmission processing of the beacon signal including these thresholds in the ESS report element. Further, the wireless communication interface 933 may dynamically set the first threshold based on the current AP reception power information included in the reconnection request signal from the subordinate terminal. In addition, the wireless communication interface 933 may manage the minimum value of the first threshold. In addition, the wireless communication interface 933 may dynamically set the second threshold according to the communication status (for example, channel usage rate or the like) of another AP 100 belonging to the same ESS. In addition, the wireless communication interface 933 may manage the second thresholds for each BSSID.

Further, the technology according to the present disclosure may be implemented as an in-vehicle system (or vehicle) 940 that includes one or more blocks of the above-described car navigation device 920, an in-vehicle network 941, and a vehicle-side module 942. The vehicle-side module 942 generates vehicle-side data such as vehicle speed, engine speed, or failure information, and outputs the generated data to the in-vehicle network 941.

6.3. Third Application Example

FIG. 26 is a block diagram illustrating an example of a schematic configuration of a radio access point 950 to which the technology according to the present disclosure can be applied. The radio access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and operates various functions (for example, access restriction, routing, encryption, firewall, log management, and the like) of an internet protocol (IP) layer of the radio access point 950 and a higher layer. The memory 952 includes a RAM and a ROM, and stores a program executed by the controller 951 and various control data (for example, terminal list, routing table, encryption key, security settings, log, and the like).

The input device 954 includes, for example, a button, a switch, or the like, and receives an operation from a user. The display device 955 includes an LED lamp or the like and displays the operation status of the radio access point 950.

The network interface 957 is a wired communication interface that connects the radio access point 950 to the wired communication network 958. The network interface 957 may have a plurality of connection terminals. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, 11ad, and 11ax, and provides wireless connection as an access point to nearby terminals. The wireless communication interface 963 can typically include a baseband processor, a radio frequency (RF) circuit, a power amplifier, and the like. The wireless communication interface 963 may be a one-chip module in which a memory that stores a communication control program, a processor that executes the program, and related circuits are integrated. The antenna switch 964 switches the connection destination of the antenna 965 among a plurality of circuits included in the wireless communication interface 963. The antenna 965 has a single or a plurality of antenna elements, and is used for transmitting and receiving a wireless signal by the wireless communication interface 963.

In the radio access point 950 illustrated in FIG. 26, the controller 951 may function as the control unit 120 of the AP 100. For example, the controller 951 may set the first threshold and the second threshold, and may integrally control the generation processing and the transmission processing of the beacon signal including these thresholds in the ESS report element. In addition, the controller 951 may dynamically set the first threshold based on the current AP reception power information included in the reconnection request signal from the subordinate terminal. In addition, the controller 951 may manage the minimum value of the first threshold. In addition, the controller 951 may dynamically set the second threshold according to the communication status (for example, channel usage rate or the like) of another AP 100 belonging to the same ESS. In addition, the controller 951 may manage the second thresholds for each BSSID.

7. SUMMARY

As described above, the AP 100 according to the present disclosure can more appropriately control the BSS transition by the STA 200 by using not only the first threshold but also the second threshold. In addition, the AP 100 can dynamically set the first threshold without scanning the surrounding environment by receiving the reconnection request signal including the current AP reception power information from the subordinate STA 200. In addition, the AP 100 can prevent the BSS connection maintaining range from being expanded beyond its own capability by setting the minimum value of the first threshold. In addition, the AP 100 can dynamically set the second threshold without scanning the surrounding environment by receiving the information on the communication status (for example, channel usage rate or the like) of another AP 100 belonging to the same ESS. In addition, the AP 100 can control the BSS transition by the STA 200 more finely by managing the second thresholds for each BSSID.

As described above, the preferred embodiments of the present disclosure have been described in detail with reference to the accompanying drawings, but the technical scope of the present disclosure is not limited to such examples. It will be apparent to those skilled in the art of the present disclosure that various changes or modifications can be conceived within the scope of the technical idea described in the claims, and it is naturally understood that these changes or modifications fall within the technical scope of the present disclosure.

For example, each step in the flowcharts and sequence diagrams described above do not necessarily have to be processed in time series in the order described. That is, each step in the flowcharts and sequence diagrams may be processed in a different order from the described order or may be processed in parallel.

In addition, the effects described in the present specification are merely illustrative or exemplary, and are not limited to those described in the present specification. That is, the technology according to the present disclosure can exhibit other effects apparent to those skilled in the art from the description of the present specification, in addition to or instead of the effects described above.

The following configurations are also within the technical scope of the present disclosure.

(1)
A wireless communication device functioning as an access point of a wireless LAN, comprising:
a control unit that dynamically sets a threshold used when a station belonging to a BSS of its own device transits to another BSS belonging to the same ESS as the BSS based on information included in a wireless signal from an external device.

(2)
The wireless communication device according to (1), wherein the control unit dynamically sets two types of the threshold.

(3)
The wireless communication device according to (2), wherein one of the two types of the threshold is a first threshold used for comparison with reception information on the wireless signal from the own device.

(4)
The wireless communication device according to (3), wherein the control unit dynamically sets the first threshold based on the reception information on the wireless signal from the own device which is included in the wireless signal from the station.

(5)
The wireless communication device according to (3) or (4), wherein
the control unit manages a minimum value of the first threshold.

(6)
The wireless communication device according to any one of (3) to (5), wherein
the other type of the two types of the threshold is a second threshold used for comparison with a difference between reception information on the wireless signal from the own device and reception information on the wireless signal from another access point.

(7)
The wireless communication device according to (6), wherein
the control unit dynamically sets the second threshold based on information on a communication status of the another access point which is included in the wireless signal from the another access point.

(8)
The wireless communication device according to (6) or (7), wherein
the control unit sets the second threshold for each BSS.

(9)
The wireless communication device according to any one of (3) to (8), wherein
the reception information is either information on reception power or information on propagation loss.

(10)
A wireless communication method realizing an access point function of a wireless LAN, comprising:
dynamically setting a threshold used when a station belonging to a BSS of its own device attempts to transit to another BSS belonging to the same ESS as the BSS based on information included in a wireless signal from an external device.

(11)
A wireless communication device functioning as a wireless LAN station, comprising:
a control unit that controls a transition to another BSS belonging to the same ESS as a BSS to which the ESS belongs, using a threshold that is dynamically set based on information included in a wireless signal from an external device and reception information on a wireless signal from an access point.

(12)
The wireless communication device according to (11), wherein
the control unit controls the transition using two types of the threshold.

(13)
The wireless communication device according to (12), wherein
the control unit controls the transition based on a comparison result of a first threshold, which is one of the two types of the thresholds, and reception information on a wireless signal from the access point.

(14)
The wireless communication device according to (13), further comprising:
a transmitting unit that transmits a wireless signal including the reception information used for the dynamic setting of the first threshold to the access point.

(15)
The wireless communication device according to (13) or (14), wherein
the control unit controls the transition based on a comparison result of a minimum value of the first threshold and the reception information on the wireless signal from the access point.

(16)

The wireless communication device according to any one of (13) to (15), wherein the control unit controls the transition based on a comparison result of a difference between the reception information on the wireless signal from the access point and reception information on a wireless signal from another access point with a second threshold that is the other type of the two types of the thresholds.

(17)

The wireless communication device according to (16), wherein the second threshold dynamically sets the access point based on a communication status of the another access point which is included in the wireless signal from the another access point.

(18)

The wireless communication device according to (16) or (17), wherein the second threshold is set for each BSS by the access point.

(19)

The wireless communication device according to any one of (11) to (18), wherein the reception information is either information on reception power or information on propagation loss.

(20)

A wireless communication method realizing a station function of a wireless LAN station, comprising:

controlling a transition to another BSS belonging to the same ESS as a BSS to which an ESS belongs, using a threshold that is dynamically set based on information included in a wireless signal from an external device and reception information on a wireless signal from an access point.

REFERENCE SIGNS LIST

100 AP
200 STA
110, 210 DATA PROCESSING UNIT
120, 220 CONTROL UNIT
130, 230 STORAGE UNIT
140, 240 TRANSMITTING UNIT
141, 241 ANALOG SIGNAL CONVERSION UNIT
142, 242 RF TRANSMITTING UNIT
150, 250 ANTENNA SHARING UNIT
160, 260 ANTENNA
170, 270 RECEIVING UNIT
171, 271 RF RECEIVING UNIT
172, 272 DIGITAL SIGNAL CONVERSION UNIT

The invention claimed is:

1. A first wireless communication device, comprising:
a transmission unit configured to transmit a first wireless signal to a station;
a receiving unit configured to receive a reconnection request signal associated with a Basic Service Set (BSS) transition of the station, wherein the reconnection request signal includes first reception information associated with the transmitted first wireless signal; and
a control unit configured to dynamically adjust a first threshold, based on the first reception information, when a transmission source of the received reconnection request signal is from a station subordinate to the first wireless communication device, wherein
the BSS transition of the station from a first BSS corresponding to the first wireless communication device to a second BSS corresponding to a second wireless communication device is based on the first threshold, and
the first BSS and the second BSS are associated with a same Extended Service Set (ESS).

2. The first wireless communication device according to claim 1, wherein the control unit is further configured to dynamically adjust a second threshold.

3. The first wireless communication device according to claim 2, wherein
the second threshold corresponds to a threshold for comparison with a difference between the first reception information and second reception information, and
the second reception information is associated with a second wireless signal transmitted from the second wireless communication device.

4. The first wireless communication device according to claim 3, wherein
the second wireless signal includes information on a communication status of the second wireless communication device, and
the control unit is further configured to dynamically adjust the second threshold based on the information on the communication status of the second wireless communication device.

5. The first wireless communication device according to claim 3, wherein the control unit is further configured to set the second threshold for each BSS corresponding to the first wireless communication device.

6. The first wireless communication device according to claim 1, wherein the BSS transition is based on comparison of the first threshold and the first reception information.

7. The first wireless communication device according to claim 6, wherein the control unit is further configured to manage a minimum value of the first threshold.

8. The first wireless communication device according to claim 6, wherein the first reception information is one of information on reception power or information on propagation loss.

9. A wireless communication method, comprising:
transmitting a first wireless signal to a station;
receiving a reconnection request signal associated with a Basic Service Set (BSS) transition of the station, wherein the reconnection request signal includes first reception information associated with the transmitted first wireless signal; and
dynamically adjusting a first threshold, based on the first reception information, when a transmission source of the received reconnection request signal is from a station subordinate to a first wireless communication device, wherein
the BSS transition of the station from a first BSS corresponding to the first wireless communication device to a second BSS corresponding to a second wireless communication device is based on the first threshold, and
the first BSS and the second BSS are associated with a same Extended Service Set (ESS).

10. A wireless communication device, comprising:
a receiving unit configured to receive a first wireless signal from a first access point associated with the wireless communication device;
a control unit configured to control a Basic Service Set (BSS) transition from a first BSS corresponding to the first access point to a second BSS corresponding to a second access point, based on a first threshold that is dynamically adjusted, wherein the first BSS and the second BSS are associated with a same Extended Service Set (ESS); and a transmission unit configured to transmit a reconnection request signal associated with the BSS transition to each of the first access point and the second access point, wherein the reconnection request signal includes first reception information associated with the transmitted first wireless signal, and the first threshold is dynamically adjusted, based on the first reception information, when a transmission source of the reconnection request signal is the wireless communication device that is subordinate to the first access point.

11. The wireless communication device according to claim 10, wherein the control unit is further configured to control the BSS transition based on a second threshold.

12. The wireless communication device according to claim 11, wherein the control unit is further configured to control the BSS transition based on a comparison result of a difference between the first reception information and a second reception information with a second threshold, and the second reception information is associated with a second wireless signal transmitted from the second access point.

13. The wireless communication device according to claim 12, wherein the second wireless signal includes information on a communication status of the second access point, and the second threshold is dynamically adjusted based on the information on the communication status of the second access point.

14. The wireless communication device according to claim 12, wherein the second threshold is set for each BSS corresponding to the first access point.

15. The wireless communication device according to claim 10, wherein the control unit is further configured to control the BSS transition based on a comparison result of the first threshold and the first reception information.

16. The wireless communication device according to claim 15, wherein the control unit is further configured to control the BSS transition based on a comparison result of a minimum value of the first threshold and the first reception information.

17. The wireless communication device according to claim 10, wherein the first reception information is one of information on reception power or information on propagation loss.

18. A wireless communication method, comprising:

receiving a first wireless signal from a first access point associated with a Wireless Local Area Network (WLAN) station;

controlling a Basic Service Set (BSS) transition from a first BSS corresponding to the first access point to a second BSS corresponding to a second access point, based on a first threshold that is dynamically adjusted, wherein the first BSS and the second BSS are associated with a same Extended Service Set (ESS); and transmitting a reconnection request signal associated with the BSS transition to each of the first access point and the second access point, wherein the reconnection request signal includes first reception information associated with the transmitted first wireless signal, and the first threshold is dynamically adjusted, based on the first reception information, when a transmission source of the reconnection request signal is the WLAN station that is subordinate to the first access point.

* * * * *